(12) United States Patent
Rowley et al.

(10) Patent No.: US 7,908,080 B2
(45) Date of Patent: Mar. 15, 2011

(54) TRANSPORTATION ROUTING

(75) Inventors: Henry Rowley, Mountain View, CA (US); Shumeet Baluja, Mountain View, CA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 11/027,769

(22) Filed: Dec. 31, 2004

(65) Prior Publication Data

US 2006/0149461 A1    Jul. 6, 2006

(51) Int. Cl.
*G01C 21/34* (2006.01)
*G08G 1/0968* (2006.01)

(52) U.S. Cl. .................................. 701/209; 340/995.13
(58) Field of Classification Search .................. 701/209; 340/995.13
See application file for complete search history.

(56) References Cited

U.S. PATENT DOCUMENTS

| | | |
|---|---|---|
| 1,266,367 A | 5/1918 | Wilson |
| 1,638,716 A | 8/1927 | Surles |
| 1,995,656 A | 3/1935 | Stout |
| 2,371,451 A | 3/1945 | Larson |
| 2,528,201 A | 10/1950 | White |
| 2,665,381 A | 1/1954 | Smith et al. |
| 2,672,945 A | 3/1954 | Harris et al. |
| 2,720,372 A | 10/1955 | Gowan |
| 2,877,427 A | 3/1959 | Butler |
| 2,966,580 A | 12/1960 | Taylor |
| 2,980,887 A | 4/1961 | Soderberg |
| 3,030,497 A | 4/1962 | Cheng |
| 3,056,106 A | 9/1962 | Hendricks |
| 3,056,121 A | 9/1962 | Jackson |
| 3,063,048 A | 11/1962 | Lehan et al. |
| 3,126,191 A | 3/1964 | Holden |
| 3,130,970 A | 4/1964 | Hutsell |
| 3,199,074 A | 8/1965 | Hales et al. |
| 3,237,154 A | 2/1966 | Barker |
| 3,275,984 A | 9/1966 | Barker |
| 3,312,436 A | 4/1967 | Beghetto, Jr. |
| 3,322,940 A | 5/1967 | Baker et al. |
| 3,324,396 A | 6/1967 | Schneider |
| 3,345,503 A | 10/1967 | Auer, Jr. |

(Continued)

FOREIGN PATENT DOCUMENTS

EP    0 061 674    10/1982

(Continued)

OTHER PUBLICATIONS

Chen and Chien, "Dynamic Freeway Travel Time Prediction Using Probe Vehicle Data: Link-based vs. Path-based," *Transportation Research Board 80th Annual Meeting*, TRB paper No. 01-2887, Jan. 7-11, 2001, Washington, DC, 14 pages.

(Continued)

*Primary Examiner* — Mark Hellner
*Assistant Examiner* — Ari M Diacou
(74) *Attorney, Agent, or Firm* — Fish & Richardson P.C.

(57) ABSTRACT

A computer-implemented method of providing personalized route information involves gathering a plurality of past location indicators over time for a wireless client device, determining a future driving objective using the plurality of previously-gathered location indicators, obtaining real-time traffic data for an area proximate to the determined driving objective, and generating a suggested route for the driving objective using the near real-time traffic data.

27 Claims, 7 Drawing Sheets

U.S. PATENT DOCUMENTS

| | | |
|---|---|---|
| 3,374,359 A | 3/1968 | Anderson |
| D216,984 S | 3/1970 | Stanford et al. |
| 3,506,808 A | 4/1970 | Riddle, Jr. et al. |
| 3,516,056 A | 6/1970 | Matthews |
| 3,558,994 A | 1/1971 | Bernstein |
| 3,563,221 A | 2/1971 | Tada |
| 3,563,335 A | 2/1971 | Holmes |
| 3,583,149 A | 6/1971 | Ganter |
| 3,626,413 A | 12/1971 | Zachmann |
| 3,644,818 A | 2/1972 | Paget |
| 3,681,697 A | 8/1972 | Moroney |
| 3,710,081 A | 1/1973 | Apitz |
| 3,711,686 A | 1/1973 | Apitz |
| 3,753,219 A | 8/1973 | King, Jr. |
| 3,774,147 A | 11/1973 | Hendricks |
| 3,798,651 A | 3/1974 | Lehman |
| 3,802,653 A | 4/1974 | Nyuiassie |
| 3,872,422 A | 3/1975 | Obermaier et al. |
| 3,885,227 A | 5/1975 | Moissl |
| 3,893,061 A | 7/1975 | Slawsky et al. |
| 3,899,671 A | 8/1975 | Stover |
| 3,906,438 A | 9/1975 | Kohnert |
| 3,916,329 A | 10/1975 | Hekimian et al. |
| 3,916,374 A | 10/1975 | Drebinger et al. |
| 3,919,686 A | 11/1975 | Narbaits-Jaureguy et al. |
| 3,978,330 A | 8/1976 | Maurer |
| 4,012,744 A | 3/1977 | Greiser |
| 4,013,969 A | 3/1977 | Dennison |
| 4,014,503 A | 3/1977 | Raimer |
| 4,021,807 A | 5/1977 | Culpepper et al. |
| 4,023,017 A | 5/1977 | Ceseri |
| 4,050,798 A | 9/1977 | Boggs |
| 4,081,783 A | 3/1978 | Honda |
| 4,086,632 A | 4/1978 | Lions |
| 4,087,066 A | 5/1978 | Bahker et al. |
| 4,087,067 A | 5/1978 | Bahker et al. |
| 4,120,037 A | 10/1978 | Sato |
| 4,138,711 A | 2/1979 | Bremenour et al. |
| 4,143,328 A | 3/1979 | Kurita et al. |
| 4,162,696 A | 7/1979 | Sprung |
| 4,163,216 A | 7/1979 | Arpino |
| 4,203,070 A | 5/1980 | Bowles et al. |
| 4,212,067 A | 7/1980 | Henderson et al. |
| 4,232,395 A | 11/1980 | Yokogawa |
| 4,237,540 A | 12/1980 | Sato |
| 4,242,639 A | 12/1980 | Boone |
| 4,247,939 A | 1/1981 | Stromswold et al. |
| 4,249,418 A | 2/1981 | Hooper |
| 4,268,894 A | 5/1981 | Bartunek et al. |
| 4,270,721 A | 6/1981 | Mainor, Jr. |
| 4,289,383 A | 9/1981 | Schwarzschild |
| 4,290,136 A | 9/1981 | Brunner et al. |
| 4,296,400 A | 10/1981 | Friedbert et al. |
| 4,297,004 A | 10/1981 | Nishimura et al. |
| 4,297,707 A | 10/1981 | Brunner et al. |
| 4,303,905 A | 12/1981 | Brebinger |
| 4,323,970 A | 4/1982 | Brunner et al. |
| 4,344,122 A | 8/1982 | Jones |
| 4,350,970 A | 9/1982 | Von Tomkewitsch |
| 4,352,086 A | 9/1982 | Hunziker |
| 4,357,593 A | 11/1982 | Von Tomkewitsch |
| 4,362,353 A | 12/1982 | Cobaugh et al. |
| 4,369,427 A | 1/1983 | Drebinger et al. |
| 4,380,745 A | 4/1983 | Barlow et al. |
| 4,380,821 A | 4/1983 | Eckhardt |
| 4,398,171 A | 8/1983 | Dahan et al. |
| 4,409,583 A | 10/1983 | Dahan et al. |
| 4,445,118 A | 4/1984 | Taylor et al. |
| 4,451,830 A | 5/1984 | Lucas et al. |
| 4,459,667 A | 7/1984 | Takeuchi |
| 4,466,701 A | 8/1984 | Ogata et al. |
| 4,485,477 A | 11/1984 | Nossen |
| 4,486,857 A | 12/1984 | Heckel |
| 4,503,103 A | 3/1985 | Mosley, Jr. et al. |
| 4,527,030 A | 7/1985 | Oelsch |
| 4,531,176 A | 7/1985 | Beecher, II |
| 4,531,236 A | 7/1985 | Ishihara |
| 4,540,865 A | 9/1985 | Calder |
| 4,549,286 A | 10/1985 | Langeraar et al. |
| 4,555,938 A | 12/1985 | Boucher et al. |
| 4,561,115 A | 12/1985 | Pfeiffer |
| 4,562,382 A | 12/1985 | Elliott |
| 4,580,289 A | 4/1986 | Enderby |
| 4,592,526 A | 6/1986 | Kobelt |
| 4,593,273 A | 6/1986 | Narcisse |
| 4,612,543 A | 9/1986 | DeVries |
| 4,613,913 A | 9/1986 | Phillips |
| 4,627,100 A | 12/1986 | Takano |
| 4,630,209 A | 12/1986 | Saito et al. |
| 4,633,194 A | 12/1986 | Kikuchi et al. |
| 4,633,517 A | 12/1986 | Pfeifer |
| 4,642,606 A | 2/1987 | Tsuyama |
| 4,644,787 A | 2/1987 | Boucher et al. |
| 4,646,015 A | 2/1987 | Phillips |
| 4,647,126 A | 3/1987 | Sobota, Jr. |
| 4,651,157 A | 3/1987 | Gray et al. |
| 4,659,881 A | 4/1987 | Dowe |
| 4,668,843 A | 5/1987 | Watanabe |
| 4,675,656 A | 6/1987 | Narcisse |
| 4,675,691 A | 6/1987 | Moore |
| 4,677,395 A | 6/1987 | Baker |
| 4,677,450 A | 6/1987 | Ito et al. |
| 4,677,563 A | 6/1987 | Itoh et al. |
| D291,288 S | 8/1987 | Suzuki |
| 4,686,642 A | 8/1987 | Buxton et al. |
| 4,687,167 A | 8/1987 | Skalka et al. |
| 4,700,332 A | 10/1987 | Hwang |
| 4,713,661 A | 12/1987 | Boone et al. |
| 4,716,522 A | 12/1987 | Funabashi et al. |
| 4,733,356 A | 3/1988 | Haeussermann et al. |
| 4,734,863 A | 3/1988 | Honey et al. |
| 4,738,625 A | 4/1988 | Burton et al. |
| 4,748,681 A | 5/1988 | Schmidt |
| 4,750,197 A | 6/1988 | Denekamp et al. |
| 4,754,465 A | 6/1988 | Trimble |
| 4,760,531 A | 7/1988 | Yasui et al. |
| 4,763,130 A | 8/1988 | Weinstein |
| 4,774,671 A | 9/1988 | Itoh et al. |
| 4,774,672 A | 9/1988 | Tsunoda et al. |
| 4,777,630 A | 10/1988 | Burns |
| 4,780,604 A | 10/1988 | Hasegawa et al. |
| 4,780,717 A | 10/1988 | Takanabe et al. |
| 4,780,791 A | 10/1988 | Morita et al. |
| 4,780,793 A | 10/1988 | Ohtsuki |
| 4,788,645 A | 11/1988 | Zavoli et al. |
| 4,792,803 A | 12/1988 | Madnick et al. |
| 4,792,907 A | 12/1988 | Ikeda et al. |
| 4,796,189 A | 1/1989 | Nakayama et al. |
| 4,796,191 A | 1/1989 | Honey et al. |
| 4,797,916 A | 1/1989 | Kojima |
| 4,809,005 A | 2/1989 | Counselman, III |
| 4,811,491 A | 3/1989 | Phillips et al. |
| 4,811,507 A | 3/1989 | Blanchet |
| 4,811,613 A | 3/1989 | Phillips et al. |
| 4,812,843 A | 3/1989 | Champion, III et al. |
| 4,812,980 A | 3/1989 | Yamada et al. |
| 4,819,174 A | 4/1989 | Furuno et al. |
| 4,819,175 A | 4/1989 | Wuttke |
| 4,829,492 A | 5/1989 | Choi et al. |
| 4,831,538 A | 5/1989 | Cucchiari et al. |
| 4,831,563 A | 5/1989 | Ando et al. |
| 4,834,329 A | 5/1989 | Delapp |
| D301,882 S | 6/1989 | Watanabe |
| 4,843,399 A | 6/1989 | Bongiorno et al. |
| 4,843,403 A | 6/1989 | Lalezari et al. |
| 4,843,544 A | 6/1989 | DuLac et al. |
| D302,160 S | 7/1989 | Egashira |
| D302,271 S | 7/1989 | Watanabe |
| 4,862,395 A | 8/1989 | Fey et al. |
| 4,868,715 A | 9/1989 | Putman et al. |
| 4,872,091 A | 10/1989 | Maniwa et al. |
| 4,889,302 A | 12/1989 | Tucker |
| 4,896,337 A | 1/1990 | Bushy, Jr. |
| 4,899,285 A | 2/1990 | Nakayama et al. |
| 4,903,325 A | 2/1990 | Yoshitake et al. |
| 4,905,124 A | 2/1990 | Banjo et al. |
| 4,907,208 A | 3/1990 | Lowrance et al. |

| Patent | Date | Inventor |
|---|---|---|
| 4,907,290 A | 3/1990 | Crompton |
| 4,912,756 A | 3/1990 | Hop |
| 4,914,605 A | 4/1990 | Loughmiller, Jr. |
| 4,921,467 A | 5/1990 | Lax |
| 4,924,402 A | 5/1990 | Ando et al. |
| 4,939,661 A | 7/1990 | Barker et al. |
| 4,939,663 A | 7/1990 | Baird |
| 4,943,951 A | 7/1990 | Leavell et al. |
| 4,953,198 A | 8/1990 | Daly et al. |
| 4,955,817 A | 9/1990 | Sugai |
| 4,956,756 A | 9/1990 | Maggelet |
| 4,969,647 A | 11/1990 | Mical et al. |
| 4,970,523 A | 11/1990 | Braisted et al. |
| 4,974,120 A | 11/1990 | Kodai et al. |
| D312,650 S | 12/1990 | Charrier |
| 4,977,509 A | 12/1990 | Pitchford et al. |
| 4,982,314 A | 1/1991 | Miki |
| 4,982,332 A | 1/1991 | Saito et al. |
| 4,985,705 A | 1/1991 | Stammler |
| D314,713 S | 2/1991 | Ciranny et al. |
| 4,989,813 A | 2/1991 | Kim et al. |
| 5,003,306 A | 3/1991 | Takahashi et al. |
| 5,005,108 A | 4/1991 | Pristash et al. |
| 5,008,647 A | 4/1991 | Brunt et al. |
| 5,017,767 A | 5/1991 | Mizuno |
| 5,020,143 A | 5/1991 | Duckeck et al. |
| 5,021,794 A | 6/1991 | Lawrence |
| 5,031,076 A | 7/1991 | Kiku |
| 5,043,736 A | 8/1991 | Darnell et al. |
| 5,045,770 A | 9/1991 | Brooks |
| 5,053,613 A | 10/1991 | Onoda |
| 5,053,928 A | 10/1991 | Pasco |
| 5,058,996 A | 10/1991 | Washizuka et al. |
| 5,067,081 A | 11/1991 | Person |
| 5,068,670 A | 11/1991 | Maoz |
| 5,068,765 A | 11/1991 | Nimpoeno |
| D323,249 S | 1/1992 | Schwartz |
| 5,081,431 A | 1/1992 | Kubo et al. |
| 5,087,919 A | 2/1992 | Odagawa et al. |
| 5,087,969 A | 2/1992 | Kamada et al. |
| 5,092,552 A | 3/1992 | Dayton et al. |
| 5,099,455 A | 3/1992 | Parra |
| 5,103,377 A | 4/1992 | Kobayashi et al. |
| 5,107,227 A | 4/1992 | Brooks |
| 5,108,334 A | 4/1992 | Eschenbach et al. |
| 5,109,364 A | 4/1992 | Stiner |
| 5,109,500 A | 4/1992 | Iseki et al. |
| D325,837 S | 5/1992 | Schwartz |
| D326,450 S | 5/1992 | Watanabe |
| 5,111,150 A | 5/1992 | Casey |
| 5,115,398 A | 5/1992 | DeJong |
| 5,119,101 A | 6/1992 | Barnard |
| 5,119,504 A | 6/1992 | Durboraw, III |
| 5,123,621 A | 6/1992 | Gates |
| 5,126,941 A | 6/1992 | Gurmu et al. |
| 5,133,076 A | 7/1992 | Hawkins et al. |
| 5,134,390 A | 7/1992 | Kishimoto et al. |
| 5,139,223 A | 8/1992 | Sedighzadeh |
| 5,142,497 A | 8/1992 | Warrow |
| 5,144,323 A | 9/1992 | Yonkers |
| 5,146,231 A | 9/1992 | Ghaem et al. |
| 5,148,002 A | 9/1992 | Kuo et al. |
| 5,151,774 A | 9/1992 | Mori et al. |
| D329,988 S | 10/1992 | Burrell et al. |
| 5,153,583 A | 10/1992 | Murdoch |
| 5,153,818 A | 10/1992 | Mukougawa et al. |
| 5,154,390 A | 10/1992 | Bain et al. |
| 5,161,169 A | 11/1992 | Galano et al. |
| 5,161,886 A | 11/1992 | DeJong et al. |
| 5,164,904 A | 11/1992 | Sumner |
| 5,172,075 A | 12/1992 | Yerbury et al. |
| 5,172,110 A | 12/1992 | Tiefengraber |
| 5,173,691 A | 12/1992 | Sumner |
| 5,173,840 A | 12/1992 | Kodai et al. |
| 5,173,849 A | 12/1992 | Brooks |
| 5,177,685 A | 1/1993 | Davis et al. |
| 5,182,555 A | 1/1993 | Sumner |
| 5,184,330 A | 2/1993 | Adams et al. |
| 5,184,830 A | 2/1993 | Okada et al. |
| 5,185,610 A | 2/1993 | Ward et al. |
| 5,189,404 A | 2/1993 | Masimo et al. |
| 5,189,539 A | 2/1993 | Suzuki |
| 5,191,792 A | 3/1993 | Gloor |
| 5,193,215 A | 3/1993 | Olmer |
| 5,196,743 A | 3/1993 | Brooks |
| 5,200,757 A | 4/1993 | Jairam |
| 5,200,902 A | 4/1993 | Pilley |
| 5,203,030 A | 4/1993 | Kawasaki |
| 5,204,817 A | 4/1993 | Yoshida |
| 5,206,641 A | 4/1993 | Grant et al. |
| 5,208,756 A | 5/1993 | Song |
| 5,210,540 A | 5/1993 | Masumoto |
| 5,212,643 A | 5/1993 | Yoshida |
| 5,216,430 A | 6/1993 | Rahm et al. |
| 5,220,509 A | 6/1993 | Takemura et al. |
| 5,223,844 A | 6/1993 | Mansell et al. |
| D337,582 S | 7/1993 | Lewo |
| 5,225,842 A | 7/1993 | Brown et al. |
| 5,226,622 A | 7/1993 | Lee Anna |
| 5,229,925 A | 7/1993 | Spencer et al. |
| 5,230,016 A | 7/1993 | Yasuda |
| 5,235,315 A | 8/1993 | Cherry et al. |
| 5,235,633 A | 8/1993 | Dennison et al. |
| 5,237,449 A | 8/1993 | Nelson et al. |
| 5,239,697 A | 8/1993 | Kosuga |
| 5,243,528 A | 9/1993 | Lefevre |
| 5,243,529 A | 9/1993 | Kashiwazaki |
| 5,245,314 A | 9/1993 | Kah, Jr. |
| 5,246,790 A | 9/1993 | Mooney et al. |
| 5,247,356 A | 9/1993 | Ciampa |
| 5,247,439 A | 9/1993 | Gurmu et al. |
| 5,248,989 A | 9/1993 | Murdoch |
| 5,255,005 A | 10/1993 | Terret et al. |
| 5,258,766 A | 11/1993 | Murdoch |
| 5,260,912 A | 11/1993 | Latham |
| 5,263,423 A | 11/1993 | Anderson |
| 5,266,958 A | 11/1993 | Durboraw, III |
| 5,267,181 A | 11/1993 | George |
| 5,272,327 A | 12/1993 | Mitchell et al. |
| 5,272,638 A | 12/1993 | Martin et al. |
| D343,081 S | 1/1994 | Schwartz |
| 5,283,589 A | 2/1994 | Blevins |
| 5,288,237 A | 2/1994 | Mizutani et al. |
| 5,289,183 A | 2/1994 | Hassett et al. |
| 5,289,195 A | 2/1994 | Inoue |
| 5,293,163 A | 3/1994 | Kakihara et al. |
| 5,297,049 A | 3/1994 | Gurmu et al. |
| 5,297,051 A | 3/1994 | Arakawa et al. |
| 5,301,368 A | 4/1994 | Hirata |
| 5,302,954 A | 4/1994 | Brooks et al. |
| 5,307,277 A | 4/1994 | Hirano |
| 5,307,515 A | 4/1994 | Kuu et al. |
| 5,311,195 A | 5/1994 | Mathis et al. |
| 5,311,339 A | 5/1994 | Fertig et al. |
| 5,313,200 A | 5/1994 | Sone |
| 5,317,311 A | 5/1994 | Martell et al. |
| 5,319,516 A | 6/1994 | Perkins |
| 5,323,164 A | 6/1994 | Endo |
| D348,886 S | 7/1994 | Watanabe |
| 5,326,059 A | 7/1994 | Pryor et al. |
| 5,327,398 A | 7/1994 | Wansley et al. |
| 5,329,546 A | 7/1994 | Lee |
| 5,330,360 A | 7/1994 | Marsh et al. |
| 5,331,563 A | 7/1994 | Masumoto et al. |
| 5,332,185 A | 7/1994 | Walker, III |
| 5,333,116 A | 7/1994 | Hawkins et al. |
| D350,137 S | 8/1994 | Watanabe |
| 5,335,145 A | 8/1994 | Kusui |
| 5,335,188 A | 8/1994 | Brisson |
| 5,337,985 A | 8/1994 | Hale |
| 5,339,222 A | 8/1994 | Simmons et al. |
| 5,343,399 A | 8/1994 | Yokoyama et al. |
| 5,345,244 A | 9/1994 | Gildea et al. |
| 5,349,530 A | 9/1994 | Odagawa |
| 5,350,147 A | 9/1994 | Paganus |
| 5,353,040 A | 10/1994 | Yamada et al. |
| 5,355,511 A | 10/1994 | Hatano et al. |
| 5,357,402 A | 10/1994 | Anhalt |

| | | |
|---|---|---|
| 5,358,135 A | 10/1994 | Robbins et al. |
| 5,361,212 A | 11/1994 | Class et al. |
| 5,363,306 A | 11/1994 | Kuwahara et al. |
| 5,364,093 A | 11/1994 | Huston et al. |
| 5,365,448 A | 11/1994 | Nobe et al. |
| 5,365,450 A | 11/1994 | Schuchman et al. |
| 5,371,754 A | 12/1994 | Berndt et al. |
| 5,373,531 A | 12/1994 | Kawasaki |
| 5,375,037 A | 12/1994 | Le Roux |
| D354,451 S | 1/1995 | Burrell et al. |
| D354,452 S | 1/1995 | Burrell et al. |
| 5,379,224 A | 1/1995 | Brown et al. |
| 5,379,658 A | 1/1995 | Lichtenfels, II et al. |
| 5,386,084 A | 1/1995 | Risko |
| 5,386,340 A | 1/1995 | Kurz |
| 5,389,934 A | 2/1995 | Kass |
| 5,392,005 A | 2/1995 | Bortolini et al. |
| 5,396,429 A | 3/1995 | Hanchett |
| 5,396,430 A | 3/1995 | Arakawa et al. |
| 5,396,431 A | 3/1995 | Shimizu et al. |
| 5,397,857 A | 3/1995 | Farquhar et al. |
| 5,402,117 A | 3/1995 | Zijderhand |
| 5,402,347 A | 3/1995 | McBurney et al. |
| 5,406,490 A | 4/1995 | Braegas |
| 5,406,491 A | 4/1995 | Lima |
| 5,408,238 A | 4/1995 | Smith |
| 5,408,385 A | 4/1995 | Fowler et al. |
| 5,410,486 A | 4/1995 | Kishi et al. |
| 5,414,253 A | 5/1995 | Baudouin et al. |
| 5,414,432 A | 5/1995 | Penny et al. |
| 5,416,666 A | 5/1995 | Maguire, Jr. |
| 5,416,712 A | 5/1995 | Geier et al. |
| 5,420,592 A | 5/1995 | Johnson |
| 5,420,779 A | 5/1995 | Payne |
| 5,424,953 A | 6/1995 | Masumoto et al. |
| 5,426,780 A | 6/1995 | Gerull et al. |
| 5,427,032 A | 6/1995 | Hiltz et al. |
| 5,428,545 A | 6/1995 | Maegawa et al. |
| 5,429,336 A | 7/1995 | Ko |
| 5,434,789 A | 7/1995 | Fraker et al. |
| D360,839 S | 8/1995 | Kim |
| D361,288 S | 8/1995 | Chandwick et al. |
| 5,438,518 A | 8/1995 | Bianco et al. |
| 5,440,448 A | 8/1995 | Stewart et al. |
| 5,440,451 A | 8/1995 | Saito et al. |
| 5,446,622 A | 8/1995 | Landry et al. |
| 5,452,212 A | 9/1995 | Yokoyama et al. |
| 5,452,217 A | 9/1995 | Kishi et al. |
| 5,452,874 A | 9/1995 | Kozloff et al. |
| D363,488 S | 10/1995 | Shumaker |
| 5,456,442 A | 10/1995 | Sutton et al. |
| 5,459,479 A | 10/1995 | Cummings |
| 5,461,365 A | 10/1995 | Schlager et al. |
| 5,463,554 A | 10/1995 | Araki et al. |
| 5,469,175 A | 11/1995 | Boman |
| 5,471,205 A | 11/1995 | Izawa |
| D365,032 S | 12/1995 | Laverick et al. |
| D365,292 S | 12/1995 | Laverick et al. |
| 5,475,599 A | 12/1995 | Yokoyama et al. |
| 5,476,241 A | 12/1995 | Helman |
| 5,477,458 A | 12/1995 | Loomis |
| 5,485,154 A | 1/1996 | Brooks et al. |
| 5,493,309 A | 2/1996 | Bjornholt |
| 5,497,148 A | 3/1996 | Oliva |
| 5,502,452 A | 3/1996 | Gomez |
| 5,502,640 A | 3/1996 | Yagyu et al. |
| 5,503,361 A | 4/1996 | Kan-O et al. |
| 5,504,683 A | 4/1996 | Gurmu et al. |
| 5,506,578 A | 4/1996 | Kishi et al. |
| 5,506,587 A | 4/1996 | Lans |
| 5,506,774 A | 4/1996 | Nobe et al. |
| 5,508,931 A | 4/1996 | Snider |
| 5,512,912 A | 4/1996 | Ross et al. |
| 5,517,253 A | 5/1996 | DeLange |
| 5,523,761 A | 6/1996 | Gildea |
| 5,523,950 A | 6/1996 | Peterson |
| 5,526,235 A | 6/1996 | Beason et al. |
| 5,528,248 A | 6/1996 | Steiner et al. |
| 5,537,323 A | 7/1996 | Schulte |
| 5,539,398 A | 7/1996 | Hall et al. |
| 5,539,645 A | 7/1996 | Mandhyan et al. |
| 5,543,789 A | 8/1996 | Behr et al. |
| 5,543,802 A | 8/1996 | Villevieille et al. |
| 5,546,107 A | 8/1996 | Deretsky et al. |
| 5,548,822 A | 8/1996 | Yogo |
| 5,552,794 A | 9/1996 | Colley et al. |
| 5,553,261 A | 9/1996 | Hasbun et al. |
| 5,555,286 A | 9/1996 | Tendler |
| 5,559,511 A | 9/1996 | Ito et al. |
| 5,559,707 A | 9/1996 | DeLorme et al. |
| 5,564,083 A | 10/1996 | Lee et al. |
| 5,564,560 A | 10/1996 | Minelli et al. |
| 5,570,095 A | 10/1996 | Drouihet et al. |
| 5,572,217 A | 11/1996 | Flawn |
| 5,575,549 A | 11/1996 | Ishikawa et al. |
| 5,581,259 A | 12/1996 | Schipper |
| 5,581,790 A | 12/1996 | Sefidvash |
| 5,584,556 A | 12/1996 | Yokoyama et al. |
| 5,586,264 A | 12/1996 | Belknap et al. |
| 5,592,367 A | 1/1997 | Sugimori et al. |
| 5,592,401 A | 1/1997 | Kramer |
| 5,594,432 A | 1/1997 | Oliva et al. |
| 5,606,732 A | 2/1997 | Vicnone, Sr. |
| 5,606,736 A | 2/1997 | Hasler et al. |
| 5,610,821 A * | 3/1997 | Gazis et al. ............... 455/456.5 |
| 5,610,971 A | 3/1997 | Vandivier |
| 5,612,804 A | 3/1997 | Hara |
| 5,613,055 A | 3/1997 | Shimoura et al. |
| 5,613,751 A | 3/1997 | Parker et al. |
| 5,618,096 A | 4/1997 | Parker et al. |
| 5,619,217 A | 4/1997 | Mailandt et al. |
| 5,626,320 A | 5/1997 | Burrell et al. |
| 5,629,668 A | 5/1997 | Downs |
| 5,629,854 A | 5/1997 | Schulte |
| 5,635,945 A | 6/1997 | McConnell et al. |
| 5,638,513 A | 6/1997 | Ananda |
| 5,646,857 A | 7/1997 | McBurney et al. |
| 5,650,770 A | 7/1997 | Schlager et al. |
| 5,652,479 A | 7/1997 | LoCascio et al. |
| 5,652,706 A | 7/1997 | Morimoto et al. |
| 5,654,718 A | 8/1997 | Beason et al. |
| 5,654,886 A | 8/1997 | Zereski et al. |
| 5,655,736 A | 8/1997 | Kozloff et al. |
| 5,657,231 A | 8/1997 | Nobe et al. |
| 5,661,364 A | 8/1997 | Kruskopf |
| 5,661,632 A | 8/1997 | Register |
| 5,665,000 A | 9/1997 | Burrell et al. |
| 5,666,279 A | 9/1997 | Takehara et al. |
| 5,673,039 A | 9/1997 | Pietzsch et al. |
| D384,661 S | 10/1997 | Burrell et al. |
| 5,675,220 A | 10/1997 | Dault et al. |
| 5,680,192 A | 10/1997 | Burrell et al. |
| 5,689,269 A | 11/1997 | Norris |
| 5,689,809 A | 11/1997 | Grube et al. |
| 5,694,534 A | 12/1997 | White, Jr. et al. |
| 5,699,056 A | 12/1997 | Yoshida |
| 5,701,121 A | 12/1997 | Murdoch |
| 5,711,013 A | 1/1998 | Collett et al. |
| D390,484 S | 2/1998 | Nishimura et al. |
| 5,715,163 A | 2/1998 | Bang et al. |
| 5,717,389 A | 2/1998 | Mertens et al. |
| 5,719,824 A | 2/1998 | Boucher |
| 5,722,083 A | 2/1998 | Koenig et al. |
| 5,729,458 A | 3/1998 | Poppen |
| 5,732,385 A | 3/1998 | Nakayama et al. |
| 5,742,256 A | 4/1998 | Wakabayashi |
| 5,742,925 A | 4/1998 | Baba |
| 5,745,054 A | 4/1998 | Wilkens |
| 5,751,246 A * | 5/1998 | Hertel ....................... 342/357.07 |
| 5,751,612 A | 5/1998 | Donovan et al. |
| 5,754,143 A | 5/1998 | Warnagiris et al. |
| 5,757,929 A | 5/1998 | Wang et al. |
| D395,250 S | 6/1998 | Kabler et al. |
| D395,252 S | 6/1998 | Nelson et al. |
| 5,759,049 A | 6/1998 | Gerber |
| 5,760,748 A | 6/1998 | Beckingham |
| 5,761,417 A | 6/1998 | Henley et al. |
| 5,765,169 A | 6/1998 | Conner |

| | | | | | | |
|---|---|---|---|---|---|---|
| 5,768,581 A | 6/1998 | Cochran | | 5,945,956 A | 8/1999 | Izawa et al. |
| 5,774,362 A | 6/1998 | Suzuki et al. | | 5,946,687 A | 8/1999 | Gehani et al. |
| 5,774,826 A | 6/1998 | McBride | | 5,947,359 A | 9/1999 | Yoshie |
| 5,774,827 A | 6/1998 | Smith, Jr. et al. | | 5,948,043 A | 9/1999 | Mathis |
| 5,775,791 A | 7/1998 | Yoshikawa et al. | | 5,951,399 A | 9/1999 | Burrell et al. |
| 5,781,150 A | 7/1998 | Norris | | 5,951,620 A | 9/1999 | Ahrens et al. |
| 5,786,789 A | 7/1998 | Janky | | 5,952,959 A | 9/1999 | Norris |
| 5,787,382 A | 7/1998 | Kurabayashi | | 5,953,367 A | 9/1999 | Zhodzicshsky et al. |
| 5,787,383 A | 7/1998 | Moroto et al. | | 5,955,973 A | 9/1999 | Anderson |
| 5,793,631 A | 8/1998 | Ito et al. | | 5,955,997 A | 9/1999 | Ho et al. |
| 5,798,882 A | 8/1998 | Lang | | 5,956,655 A | 9/1999 | Suzuki et al. |
| 5,802,366 A | 9/1998 | Row et al. | | 5,959,529 A | 9/1999 | Kail |
| 5,802,492 A | 9/1998 | DeLorme et al. | | 5,959,577 A | 9/1999 | Fan et al. |
| 5,806,017 A | 9/1998 | Hancock | | 5,960,411 A | 9/1999 | Hartman et al. |
| 5,808,581 A | 9/1998 | Braisted et al. | | 5,963,130 A | 10/1999 | Schlager et al. |
| 5,809,447 A | 9/1998 | Kato et al. | | 5,964,443 A | 10/1999 | Leveille |
| 5,812,069 A * | 9/1998 | Albrecht et al. ............. 340/905 | | 5,966,645 A | 10/1999 | Davis |
| 5,812,591 A | 9/1998 | Shumaker et al. | | 5,967,479 A | 10/1999 | Sweere et al. |
| 5,815,126 A | 9/1998 | Fan et al. | | 5,969,609 A | 10/1999 | Murdoch |
| 5,815,824 A | 9/1998 | Saga et al. | | 5,970,400 A | 10/1999 | Dwyer |
| 5,819,201 A | 10/1998 | DeGraaf | | 5,975,474 A | 11/1999 | Kaplan et al. |
| 5,820,080 A | 10/1998 | Eschenbach | | 5,978,730 A | 11/1999 | Poppen et al. |
| 5,825,327 A | 10/1998 | Krasner | | 5,982,298 A | 11/1999 | Lappenbusch et al. |
| 5,835,755 A | 11/1998 | Stellwagen, Jr. | | 5,986,616 A | 11/1999 | Edvardsson |
| 5,838,281 A | 11/1998 | Blaese | | 5,987,374 A | 11/1999 | Akutsu et al. |
| 5,839,088 A | 11/1998 | Hancock et al. | | 5,987,377 A | 11/1999 | Westerlage et al. |
| 5,845,227 A | 12/1998 | Peterson | | 5,987,380 A | 11/1999 | Backman et al. |
| 5,848,373 A | 12/1998 | DeLorme et al. | | 5,990,846 A | 11/1999 | Dichter |
| 5,848,378 A | 12/1998 | Shelton et al. | | 5,991,692 A | 11/1999 | Spencer, II et al. |
| 5,850,612 A | 12/1998 | Kulberg et al. | | 5,995,064 A | 11/1999 | Yanagisawa et al. |
| 5,852,791 A | 12/1998 | Sato et al. | | 5,995,970 A | 11/1999 | Robinson et al. |
| 5,854,608 A | 12/1998 | Leisten | | 5,996,954 A | 12/1999 | Rosen et al. |
| D404,666 S | 1/1999 | Wrisley | | 5,999,882 A | 12/1999 | Simpson et al. |
| 5,862,244 A | 1/1999 | Kleiner et al. | | 6,002,982 A | 12/1999 | Fry |
| 5,862,511 A | 1/1999 | Croyle et al. | | 6,003,024 A | 12/1999 | Bair et al. |
| 5,868,582 A | 2/1999 | Jacobi | | 6,006,161 A | 12/1999 | Katou |
| 5,874,920 A | 2/1999 | Araki et al. | | 6,011,510 A | 1/2000 | Yee et al. |
| 5,877,724 A | 3/1999 | Davis | | 6,012,693 A | 1/2000 | Voeller et al. |
| 5,878,368 A | 3/1999 | DeGraaf | | 6,016,485 A | 1/2000 | Amakawa et al. |
| 5,881,985 A | 3/1999 | Hoenig | | 6,021,371 A | 2/2000 | Fultz |
| 5,884,219 A | 3/1999 | Curtwright et al. | | 6,021,406 A | 2/2000 | Kuznetson |
| 5,888,076 A | 3/1999 | Itoh et al. | | 6,023,245 A | 2/2000 | Gomez et al. |
| 5,889,364 A | 3/1999 | McGuigan et al. | | 6,023,653 A | 2/2000 | Ichimura et al. |
| 5,889,474 A | 3/1999 | LaDue | | 6,026,384 A | 2/2000 | Poppen |
| 5,889,477 A | 3/1999 | Fastenrath | | 6,027,257 A | 2/2000 | Richards et al. |
| 5,890,092 A | 3/1999 | Kato et al. | | 6,029,072 A | 2/2000 | Barber |
| 5,893,081 A | 4/1999 | Poppen | | 6,029,111 A | 2/2000 | Croyle |
| 5,898,408 A | 4/1999 | Du | | 6,029,141 A | 2/2000 | Bezos et al. |
| D409,927 S | 5/1999 | Wiegers et al. | | 6,032,219 A | 2/2000 | Robinson et al. |
| 5,901,183 A | 5/1999 | Garin et al. | | 6,037,942 A | 3/2000 | Millington |
| 5,902,347 A | 5/1999 | Backman et al. | | 6,038,509 A * | 3/2000 | Poppen et al. ................ 701/210 |
| 5,905,451 A | 5/1999 | Sakashita | | 6,042,338 A | 3/2000 | Brafford et al. |
| 5,905,507 A | 5/1999 | Rossignac et al. | | 6,047,939 A | 4/2000 | Kim |
| 5,906,825 A | 5/1999 | Seabrook, Jr. et al. | | 6,049,309 A | 4/2000 | Timoshin et al. |
| 5,908,464 A | 6/1999 | Kishigami et al. | | 6,049,755 A | 4/2000 | Lou et al. |
| 5,909,672 A | 6/1999 | Madore et al. | | 6,050,535 A | 4/2000 | Kang |
| 5,910,882 A | 6/1999 | Burrell | | 6,052,597 A | 4/2000 | Ekstrom |
| 5,911,773 A | 6/1999 | Mutsuga et al. | | 6,052,646 A | 4/2000 | Kirkhart et al. |
| 5,913,917 A | 6/1999 | Murphy | | 6,054,813 A | 4/2000 | Takeda et al. |
| 5,913,918 A | 6/1999 | Nakano et al. | | 6,055,479 A | 4/2000 | Kirkhart et al. |
| 5,914,675 A | 6/1999 | Tognazzini | | D425,499 S | 5/2000 | Millington |
| 5,914,685 A | 6/1999 | Koziov et al. | | 6,059,843 A | 5/2000 | Kirkhart |
| 5,916,299 A | 6/1999 | Poppen | | 6,067,046 A | 5/2000 | Nichols |
| 5,918,841 A | 7/1999 | Sweere et al. | | 6,076,039 A | 6/2000 | Kabel et al. |
| 5,922,041 A | 7/1999 | Anderson | | 6,076,111 A | 6/2000 | Chiu et al. |
| 5,924,665 A | 7/1999 | Sweere et al. | | 6,077,095 A | 6/2000 | DelPrete et al. |
| 5,926,113 A * | 7/1999 | Jones et al. ................... 340/906 | | 6,078,864 A | 6/2000 | Long et al. |
| 5,930,200 A | 7/1999 | Kabel | | 6,079,682 A | 6/2000 | Olkkola |
| D412,450 S | 8/1999 | McCain | | D427,919 S | 7/2000 | Laverick et al. |
| 5,931,102 A | 8/1999 | Grahl | | 6,085,090 A | 7/2000 | Yee et al. |
| 5,931,555 A | 8/1999 | Akahane et al. | | 6,088,000 A | 7/2000 | Ho |
| 5,931,888 A | 8/1999 | Hiyokawa | | 6,089,520 A | 7/2000 | Wu et al. |
| 5,936,553 A | 8/1999 | Kabel | | 6,091,368 A | 7/2000 | Mitchell et al. |
| 5,938,159 A | 8/1999 | Hung | | D429,173 S | 8/2000 | Laverick et al. |
| 5,938,720 A | 8/1999 | Tamai | | 6,097,339 A | 8/2000 | Filipovic et al. |
| 5,938,721 A | 8/1999 | Dussell et al. | | 6,101,443 A | 8/2000 | Kato et al. |
| 5,940,776 A | 8/1999 | Baron et al. | | 6,107,940 A | 8/2000 | Grimm |
| 5,943,018 A | 8/1999 | Miller | | 6,107,970 A | 8/2000 | Holshouser et al. |
| 5,945,950 A | 8/1999 | Elbadawy | | 6,108,269 A | 8/2000 | Kabel |

| | | | |
|---|---|---|---|
| 6,108,603 A | 8/2000 | Karunanidhi | |
| 6,111,539 A | 8/2000 | Mannings et al. | |
| 6,112,143 A * | 8/2000 | Allen et al. ............ 701/25 | |
| 6,121,923 A | 9/2000 | King | |
| 6,122,593 A | 9/2000 | Friederich et al. | |
| 6,125,325 A | 9/2000 | Kohli | |
| 6,127,945 A | 10/2000 | Mura-Smith | |
| 6,128,515 A | 10/2000 | Kabler et al. | |
| 6,129,321 A | 10/2000 | Minelli et al. | |
| 6,133,874 A | 10/2000 | Krasner | |
| 6,133,886 A | 10/2000 | Fariello et al. | |
| 6,141,621 A | 10/2000 | Piwowarski et al. | |
| 6,144,917 A | 11/2000 | Walters et al. | |
| 6,148,262 A | 11/2000 | Fry | |
| 6,150,961 A | 11/2000 | Alewine et al. | |
| 6,151,550 A | 11/2000 | Nakatani | |
| 6,154,184 A | 11/2000 | Endo et al. | |
| 6,157,346 A | 12/2000 | Ho | |
| 6,160,523 A | 12/2000 | Ho | |
| 6,161,092 A | 12/2000 | Latshaw et al. | |
| 6,163,269 A | 12/2000 | Millington et al. | |
| 6,172,641 B1 | 1/2001 | Millington | |
| 6,173,933 B1 | 1/2001 | Whiteside et al. | |
| 6,177,873 B1 | 1/2001 | Cragun | |
| 6,178,380 B1 | 1/2001 | Millington | |
| 6,182,006 B1 | 1/2001 | Meek | |
| 6,182,010 B1 | 1/2001 | Berstis | |
| 6,188,778 B1 | 2/2001 | Higashikubo et al. | |
| 6,188,955 B1 | 2/2001 | Robinson et al. | |
| 6,188,956 B1 | 2/2001 | Walters | |
| 6,192,257 B1 | 2/2001 | Ray | |
| 6,199,008 B1 | 3/2001 | Aratow et al. | |
| 6,199,013 B1 | 3/2001 | O'Shea | |
| 6,209,026 B1 | 3/2001 | Ran et al. | |
| 6,213,438 B1 | 4/2001 | Ostby et al. | |
| 6,215,680 B1 | 4/2001 | Rolston | |
| 6,216,064 B1 | 4/2001 | Johnson et al. | |
| 6,222,485 B1 | 4/2001 | Walters et al. | |
| 6,229,479 B1 | 5/2001 | Kozlov et al. | |
| 6,236,932 B1 * | 5/2001 | Fastenrath ............ 701/117 | |
| 6,236,933 B1 | 5/2001 | Lang | |
| 6,240,362 B1 * | 5/2001 | Gaspard, II ............ 701/209 | |
| 6,240,364 B1 * | 5/2001 | Kerner et al. ............ 701/210 | |
| 6,246,958 B1 | 6/2001 | Hirono | |
| 6,252,605 B1 | 6/2001 | Beesley et al. | |
| 6,256,029 B1 | 7/2001 | Millington | |
| 6,256,577 B1 | 7/2001 | Graunke | |
| 6,262,337 B1 | 7/2001 | Von Euler et al. | |
| 6,265,571 B1 | 7/2001 | Shi et al. | |
| 6,266,612 B1 | 7/2001 | Dussell et al. | |
| 6,272,189 B1 | 8/2001 | Garin et al. | |
| 6,282,486 B1 * | 8/2001 | Bates et al. ............ 701/117 | |
| 6,282,495 B1 | 8/2001 | Kirkhart et al. | |
| 6,285,950 B1 | 9/2001 | Tanimoto | |
| 6,292,743 B1 * | 9/2001 | Pu et al. ............ 701/202 | |
| 6,308,134 B1 | 10/2001 | Croyle et al. | |
| 6,314,365 B1 | 11/2001 | Smith | |
| 6,314,368 B1 | 11/2001 | Gurmu et al. | |
| 6,317,684 B1 | 11/2001 | Roeseler et al. | |
| 6,317,685 B1 * | 11/2001 | Kozak et al. ............ 701/210 | |
| 6,317,686 B1 | 11/2001 | Ran | |
| 6,317,687 B1 | 11/2001 | Morimoto et al. | |
| 6,317,689 B1 | 11/2001 | Lee | |
| 6,321,158 B1 | 11/2001 | DeLorme et al. | |
| 6,328,575 B1 | 12/2001 | Burrell | |
| 6,329,946 B1 | 12/2001 | Hirata et al. | |
| 6,330,149 B1 | 12/2001 | Burrell | |
| 6,334,087 B1 | 12/2001 | Nakano et al. | |
| 6,335,905 B1 | 1/2002 | Kabel | |
| 6,347,280 B1 | 2/2002 | Inoue et al. | |
| 6,353,795 B1 | 3/2002 | Ranjan | |
| 6,353,798 B1 | 3/2002 | Green et al. | |
| 6,360,167 B1 | 3/2002 | Millington et al. | |
| 6,362,751 B1 | 3/2002 | Upparapalli | |
| 6,362,779 B1 | 3/2002 | Meek et al. | |
| 6,363,322 B1 | 3/2002 | Millington | |
| 6,373,430 B1 | 4/2002 | Beason et al. | |
| 6,374,177 B1 | 4/2002 | Lee et al. | |
| 6,374,179 B1 | 4/2002 | Smith et al. | |
| 6,374,180 B1 | 4/2002 | Siominski et al. | |
| 6,377,516 B1 | 4/2002 | Whiteside et al. | |
| 6,381,540 B1 | 4/2002 | Beason et al. | |
| 6,384,798 B1 | 5/2002 | Barta et al. | |
| 6,385,537 B2 * | 5/2002 | Gaspard, II ............ 701/209 | |
| 6,385,542 B1 | 5/2002 | Millington | |
| 6,392,593 B1 | 5/2002 | Pemble | |
| 6,397,145 B1 | 5/2002 | Millington | |
| 6,400,753 B1 | 6/2002 | Kohil et al. | |
| 6,401,027 B1 | 6/2002 | Xu et al. | |
| 6,402,334 B1 | 6/2002 | Yu-San | |
| 6,405,130 B1 | 6/2002 | Piwowarski | |
| 6,407,709 B1 | 6/2002 | Hanshew | |
| 6,411,502 B1 | 6/2002 | Burrell | |
| 6,411,897 B1 * | 6/2002 | Gaspard, II ............ 701/209 | |
| 6,411,899 B2 | 6/2002 | Dussell et al. | |
| 6,415,223 B1 | 7/2002 | Lin et al. | |
| 6,415,226 B1 | 7/2002 | Kozak | |
| 6,421,609 B2 | 7/2002 | Kohil | |
| 6,429,812 B1 | 8/2002 | Hoffberg | |
| 6,430,501 B1 | 8/2002 | Siominski | |
| 6,434,485 B1 | 8/2002 | Beason et al. | |
| 6,452,544 B1 | 9/2002 | Hakala et al. | |
| 6,456,935 B1 | 9/2002 | Ng | |
| 6,459,987 B1 | 10/2002 | Krull et al. | |
| 6,463,091 B1 | 10/2002 | Zhodzicshsky et al. | |
| 6,463,385 B1 | 10/2002 | Fry | |
| 6,464,185 B1 | 10/2002 | Minelli et al. | |
| 6,466,514 B1 | 10/2002 | Kabel | |
| 6,466,862 B1 | 10/2002 | DeKock et al. | |
| 6,470,268 B1 | 10/2002 | Ashcraft et al. | |
| 6,483,457 B2 | 11/2002 | Hirata et al. | |
| 6,484,089 B1 | 11/2002 | Millington | |
| 6,490,519 B1 * | 12/2002 | Lapidot et al. ............ 701/117 | |
| 6,492,941 B1 | 12/2002 | Beason et al. | |
| 6,505,118 B2 * | 1/2003 | Chowanic et al. ............ 701/209 | |
| 6,506,267 B1 | 2/2003 | Cherveny et al. | |
| 6,516,267 B1 | 2/2003 | Cherveny et al. | |
| 6,526,350 B2 | 2/2003 | Seklyama | |
| 6,529,822 B1 | 3/2003 | Millington et al. | |
| 6,529,824 B1 | 3/2003 | Obradovich et al. | |
| 6,529,829 B2 | 3/2003 | Turetzky et al. | |
| 6,532,419 B1 | 3/2003 | Begin et al. | |
| 6,539,301 B1 | 3/2003 | Shirk et al. | |
| 6,542,814 B2 | 4/2003 | Polidi et al. | |
| 6,552,656 B2 | 4/2003 | Polidi et al. | |
| 6,553,308 B1 | 4/2003 | Uhlmann et al. | |
| 6,574,548 B2 | 6/2003 | DeKock et al. | |
| 6,574,551 B1 | 6/2003 | Maxwell et al. | |
| 6,574,558 B2 | 6/2003 | Kohli | |
| 6,591,188 B1 * | 7/2003 | Ohler ............ 701/209 | |
| 6,594,576 B2 | 7/2003 | Fan et al. | |
| 6,594,617 B2 | 7/2003 | Scherzinger | |
| 6,600,994 B1 | 7/2003 | Polidi | |
| 6,601,012 B1 | 7/2003 | Horvitz et al. | |
| 6,611,753 B1 | 8/2003 | Millington | |
| 6,618,669 B2 * | 9/2003 | Ota et al. ............ 701/208 | |
| 6,622,086 B2 | 9/2003 | Polidi | |
| 6,622,087 B2 | 9/2003 | Anderson | |
| 6,668,227 B2 * | 12/2003 | Hamada et al. ............ 701/208 | |
| 6,674,402 B2 | 1/2004 | Hirata et al. | |
| 6,680,674 B1 | 1/2004 | Park | |
| 6,687,615 B1 | 2/2004 | Krull et al. | |
| 6,691,031 B2 | 2/2004 | Lokshin et al. | |
| 6,711,499 B2 | 3/2004 | Millington | |
| 6,729,176 B2 | 5/2004 | Begin | |
| 6,735,516 B1 | 5/2004 | Manson | |
| 6,741,928 B2 | 5/2004 | Millington et al. | |
| 6,765,554 B2 | 7/2004 | Millington | |
| 6,785,606 B2 | 8/2004 | DeKock et al. | |
| 6,812,888 B2 | 11/2004 | Drury et al. | |
| 6,836,725 B2 | 12/2004 | Millington et al. | |
| 6,845,316 B2 | 1/2005 | Yates | |
| 6,850,844 B1 | 2/2005 | Walters et al. | |
| 6,862,524 B1 | 3/2005 | Nagda et al. | |
| 6,864,807 B2 | 3/2005 | Todoriki et al. | |
| 6,873,907 B1 | 3/2005 | Millington et al. | |
| 6,901,330 B1 | 5/2005 | Krull et al. | |
| 6,911,918 B2 | 6/2005 | Chen | |

| | | | |
|---|---|---|---|
| 6,967,573 B1 | 11/2005 | Murdoch et al. | |
| 7,075,459 B1 | 7/2006 | Begin et al. | |
| 7,142,979 B1 | 11/2006 | Shonk | |
| 7,170,518 B1 | 1/2007 | Millington et al. | |
| D539,677 S | 4/2007 | Riddiford | |
| 7,233,860 B2 | 6/2007 | Lokshin et al. | |
| 7,248,145 B2 | 7/2007 | Littlechild et al. | |
| 7,259,654 B2 | 8/2007 | Littlechild et al. | |
| 2001/0014847 A1* | 8/2001 | Keenan | 701/117 |
| 2001/0029425 A1* | 10/2001 | Myr | 701/200 |
| 2001/0037305 A1* | 11/2001 | Mochizuki | 705/52 |
| 2002/0004703 A1* | 1/2002 | Gaspard, II | 701/209 |
| 2002/0013656 A1* | 1/2002 | Namba | 701/200 |
| 2002/0047787 A1* | 4/2002 | Mikkola et al. | 340/995 |
| 2002/0055818 A1* | 5/2002 | Gaspard, II | 701/209 |
| 2002/0062246 A1* | 5/2002 | Matsubara | 705/14 |
| 2002/0065604 A1* | 5/2002 | Sekiyama | 701/209 |
| 2002/0077748 A1 | 6/2002 | Nakano | |
| 2002/0077910 A1* | 6/2002 | Shioda et al. | 705/14 |
| 2002/0091485 A1 | 7/2002 | Mikuriya et al. | |
| 2002/0091486 A1* | 7/2002 | Hubschneider et al. | 701/209 |
| 2002/0093493 A1 | 7/2002 | Michaeli et al. | |
| 2002/0107027 A1* | 8/2002 | O'Neil | 455/456 |
| 2002/0120389 A1* | 8/2002 | Fushiki et al. | 701/117 |
| 2002/0128766 A1* | 9/2002 | Petzold et al. | 701/201 |
| 2002/0158922 A1 | 10/2002 | Clark et al. | |
| 2002/0161517 A1* | 10/2002 | Yano et al. | 701/209 |
| 2002/0169540 A1* | 11/2002 | Engstrom | 701/200 |
| 2002/0169551 A1 | 11/2002 | Inoue et al. | |
| 2003/0065442 A1* | 4/2003 | Touney | 701/210 |
| 2003/0078055 A1* | 4/2003 | Smith et al. | 455/456 |
| 2003/0139150 A1 | 7/2003 | Rodriguez et al. | |
| 2003/0171870 A1 | 9/2003 | Gueziec | |
| 2003/0236818 A1 | 12/2003 | Bruner et al. | |
| 2004/0068362 A1* | 4/2004 | Maekawa et al. | 701/200 |
| 2004/0083037 A1 | 4/2004 | Yamane et al. | |
| 2004/0093392 A1* | 5/2004 | Nagamatsu et al. | 709/218 |
| 2004/0104842 A1 | 6/2004 | Drury et al. | |
| 2004/0128066 A1* | 7/2004 | Kudo et al. | 701/204 |
| 2004/0204842 A1* | 10/2004 | Shinozaki | 701/209 |
| 2004/0243533 A1 | 12/2004 | Dempster et al. | |
| 2005/0027446 A1* | 2/2005 | Ishibashi et al. | 701/209 |
| 2005/0052462 A1 | 3/2005 | Sakamoto et al. | |
| 2005/0099321 A1 | 5/2005 | Pearce | |
| 2005/0099322 A1 | 5/2005 | Wainfan et al. | |
| 2006/0041374 A1* | 2/2006 | Inoue | 701/207 |
| 2006/0178918 A1 | 8/2006 | Mikurak | |
| 2006/0241855 A1* | 10/2006 | Joe et al. | 701/202 |
| 2009/0281850 A1* | 11/2009 | Bruce et al. | 705/7 |

FOREIGN PATENT DOCUMENTS

| | | |
|---|---|---|
| EP | 0 123 562 | 10/1984 |
| EP | 0 242 099 | 10/1987 |
| FR | 2 541 801 | 8/1984 |
| JP | 57-159310 | 10/1982 |
| JP | 5-007239 | 1/1993 |
| JP | 5-011700 | 1/1993 |
| JP | 5-35903 | 2/1993 |
| JP | 5-100240 | 4/1993 |
| JP | 5-173478 | 7/1993 |
| JP | 5-173479 | 7/1993 |
| JP | 7-55910 | 3/1995 |
| JP | 8-212490 | 8/1996 |
| JP | 8-263783 | 10/1996 |
| JP | 9-259387 | 10/1997 |
| JP | 9-292834 | 11/1997 |
| JP | 9-305891 | 11/1997 |
| JP | 10-293035 | 11/1998 |
| JP | 11-31295 | 2/1999 |
| JP | 11-086164 | 3/1999 |
| JP | 11-328581 | 11/1999 |
| JP | 11-353582 | 12/1999 |

OTHER PUBLICATIONS

Klügl and Bazzan, "Route Decision Behaviour in a Commuting Scenario: Simple Heuristics Adaptation and Effect of Traffic Forecast," *Journal of Artificial Societies and Social Simulation*, 2004, 7(1), 22 pages.

"New system could reduce commute times," *Daily Planet*, Jan. 20, 2001, 3 pages.

Shekhar, Shashi and Duen-Ren Liu. "Genesis and Advanced Traveler Information Systems (ATIS): Killer Applications for Mobile Computer?" Department of Computer Science, University of Minnesota; Nov. 1994.

Blumentritt, et al., TravTek System Architecture Evaluation, Jul. 1995, Federal Highway Administratin, McLean, Virginia.

Imnan, et al., TravTek Global Evaluation and Executive Summary, Mar. 1996, Federal Highway Administration, McLean, Virginia.

* cited by examiner

TRANSPORTATION ROUTING

TECHNICAL FIELD

The invention relates to assisting commuters and other travelers with travel planning, and more particularly to providing a recommended route that takes current traffic conditions into account.

BACKGROUND

The world seems to increase in speed every year, with people using technology to communicate instantly and continuously, next-day delivery a common occurrence, and with the immediate availability of to on-line data. However, traffic in most metropolitan areas continues to worsen. As a result, many of us spend much of the time we would otherwise save using technology waiting in traffic to get to work so that we can use the technology.

People develop ad hoc solutions to the traffic problem. Some leave for work early or late to avoid traffic. Others develop short-cuts or other alternative routes to by-pass areas of congested traffic. Such a process is generally approached via a trial-and-error process, as a commuter tries various routes until they find one that seems to be the quickest. Of course, because traffic is different every day, it is very difficult to compare the speed of one route to that of another. It is also possible to check traffic reports before leaving and to monitor the radio or road-side signs for clues to traffic problems. In addition, certain wireless services can provide indications of real-time traffic speed graphically on a road map (such as by showing different-colored arrows on roads to indicate approximate traffic speed).

Yet there is still a need for a system and process for providing improved routing information to a traveler such as a commuter.

SUMMARY

A computer-implemented method of providing personalized route information is disclosed. The method comprises gathering a plurality of past location indicators over time for a wireless client device, determining a future travel objective using the plurality of previously-gathered location indicators, obtaining transportation flow data for an area proximate to the determined driving objective, and generating a suggested route for the travel objective using the transportation flow data. Information for the suggested route may also be transmitted to the wireless device, and may be transmitted at a predetermined time of day. In addition, Information indicative of real-time traffic data may be transmitted.

In some embodiments, the location indicators may be gathered using a GPS-enabled device, and may be gathered automatically. Each location indicator may also be gathered in response to a request from a user of the client device or as the result of a cell-tower hand-off for the device. The location indicators may be grouped according to multiple different time periods. In addition, an updated suggested route may be generated based on updated real-time traffic data and position information from the device, which may comprise a cell phone or an on-board navigation system In another embodiment, a computer-implemented navigation system is provided. The system comprises a location generator for a moving vehicle that produces data indicative of a plurality of vehicle locations, a navigation point generator that analyzes the data indicative of a plurality of vehicle locations and generates one or more expected navigation points for the vehicle, and a route generator that receives information indicative of transportation flow near the one or more expected navigation points, and generates data for one or more optimized routes through the one or more expected navigation points. The system may also comprise a response formatter that generates data in the form of an electronic document for viewing on a remote device. The system may also comprise a response formatter that generates data in a form usable by a navigation device having client-level map generation capability. The information indicative of transportation flow may include real-time traffic data.

In yet another embodiment, a computer-implemented navigation device is provided having memory for storing instructions that, when executed obtain information showing a suggested navigation route, receive a command in response to display of the information showing a suggested navigation route, and transmit data relating to the command to a remote system and receive follow-up information in response to the transmission of data relating to the command. The instructions may also generate location information for use in computing expected navigation points for the device based on past locations for the device. The expected navigation points may be computed for a time period corresponding to a time period for the past locations for the device, and the obtaining of information showing a suggested navigation route may occur at a predetermined time of the day.

In another embodiment, a navigation system is provided. The system comprises a location generator for a moving vehicle that produces data indicative of a plurality of vehicle locations, a navigation point generator that analyzes the data indicative of a plurality of vehicle locations and generates one or more expected navigation points for the vehicle, and means for generating one or more optimized routes through the one or more expected navigation points.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

The systems and techniques described here relate to assistance with planning routes for commuters and other travelers, typically traveling by automobile, truck, or mass transit. The systems can take many forms, including personal communicators, personal computers, and vehicle navigation systems. The data may also be entered in many forms, including by telephone keypad and voice. In general, the systems operate by identifying a user's paths of travel over time, developing a travel profile for the user comprising navigation points through which the user is likely to pass, and accessing real-time traffic data to provide the user with an up-to-date suggested route for the user's expected trip or trips each time the user begins a trip.

Advantageously, the systems and techniques may let travelers receive routing information that is both current and relevant. It is current because it reflects real-time traffic conditions. In addition, it can be calculated according to a schedule and delivered so that the user has the information as soon as it is needed. It is relevant because it can provide directions that address the particular user's travel plan without requiring that the user enter in detailed information about the travel plan. In addition to real-time traffic data, other traffic flow information or data may be monitored or obtained. For example, static information about traffic flow, such as the typical speed on a residential street (for which actual real-time information is not available) may also represent the transportation flow on that street. Apart from transportation flow in vehicles, other transportation flows such as that involved with rail, ferry, and light rail may also be obtained.

Figure 1:
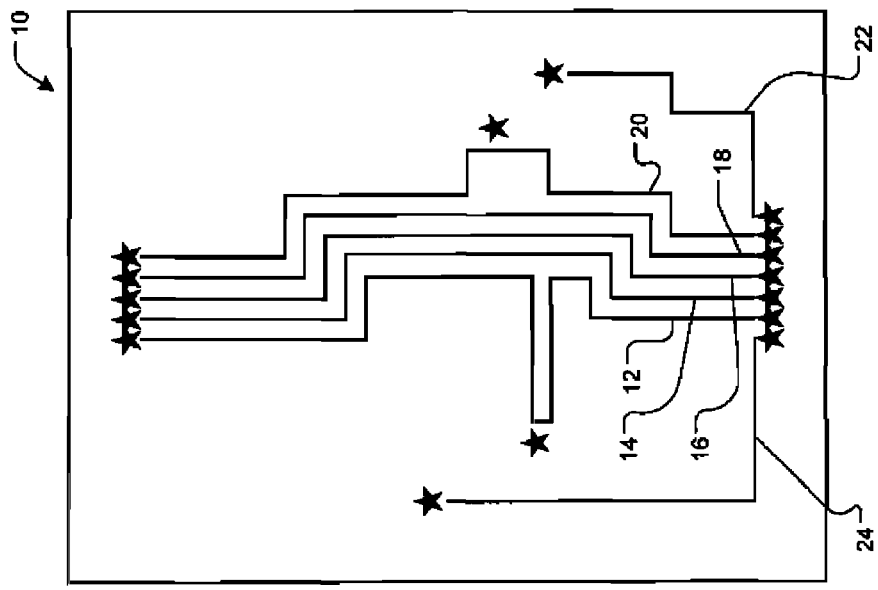
FIG. 1 is a conceptual diagram of a process that analyzes trip patterns and generates a suggested route based on the patterns and real-time traffic data.
Figure 1:
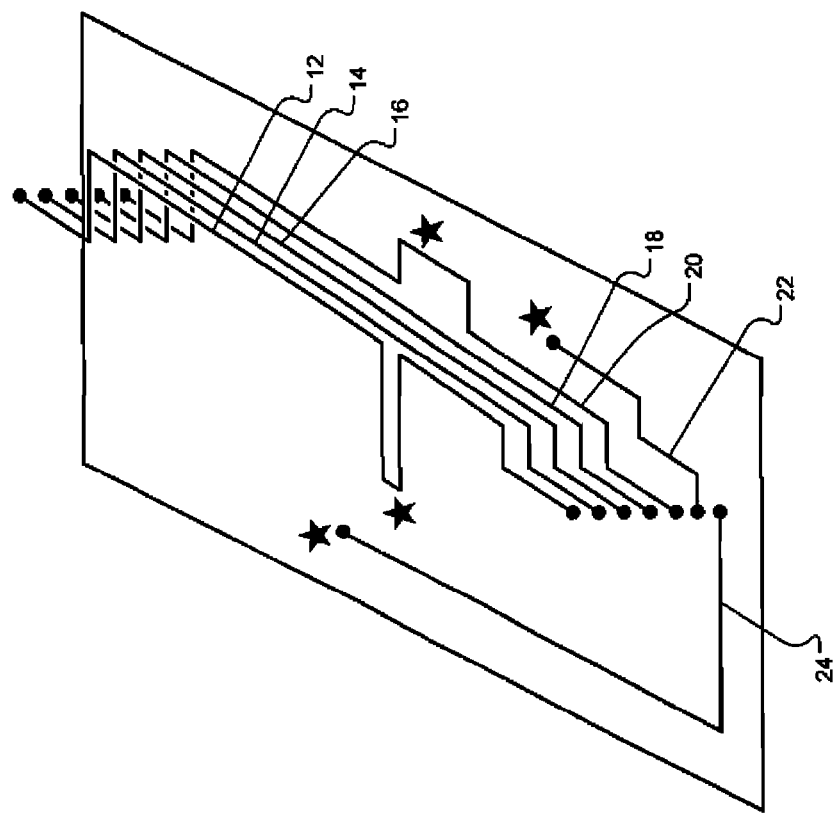

FIG. 1 is a conceptual diagram of a process that analyzes trip patterns and generates a suggested route based on the patterns and real-time traffic data. The diagram shows both perspective and plan (from above) views. A travel zone 10 represents a general area in which a user typically travels, such as the area between and around the user's home and workplace. The travel zone 10 may be most conveniently represented as a two-dimensional map, on which routes may be overlaid.

Layered on top of travel zone 10 are a number of travel routes 12-24 which in the figure each represent a route that has been traveled by a user. Data for the routes 12-24 may be gathered in any appropriate manner. For example, global positioning system (GPS) data may be collected, such as by a cellular telephone, personal digital assistant (PDA), automotive navigation device, or other such device.

The data may be collected, for example, by sampling position data at set intervals such as every fifteen seconds, or at another interval. In addition, the position data may be recorded at set location intervals, with the elapsed time between positions representing the rate of change in position. The data may also be generated from triangulation in a cellular telephone system or other appropriate method.

The data collection may be instituted in a number of ways. As one example, a user may place a device such as a cellular telephone, PDA, or navigation system into a "learn mode," such as by selecting an appropriate menu choice in a graphical user interface. A tracking system may then be activated whenever, during the learning period, the device is substantially moved, so as to indicate that the user is making a trip in their vehicle. For many travelers, such activity would occur in the morning and the evening during typical commute periods.

The learning period may be a definite or an indefinite period. For example, the device may be programmed to capture data for one week and then stop capturing data. Alternatively, data may be gathered until a recurring pattern begins to show in the data. In such an approach, a minimum collection period, such as one week, may be set so that the system does not stop gathering data simply because, by coincidence, two days in a row involved similar routes. Where the period is indefinite, the system may, for example, continue gathering data so as to update the information continuously, so that predictions of future routes may be made more readily. Such an approach may therefore allow the predicted routes to change as the user changes, such as when the user begins stopping at a day care center every weekday, and thus adds a detour to the user's previous path to work.

Each of the travel routes 12-24 represents a particular path taken by the user. The pictured travel routes 12-24 may be a subset of all routes taken by the user during the learning period, and may be selected as all trips during a particular time of day, such as during the morning commute time. Routes for other times may be handled together as a distinct group. In addition, routes that are unlike any others, and that are not repeated, may be treated as a lark and may be discarded, or simply saved in memory (e.g., as part of a "recently visited" list), but not used to predict future routes.

Each travel route may have a number of identifying characteristics. By way of example, route 12 has a start point 12a, an end point 12b, and a stop point 12c. The start point and end point for a trip may be inferred by identifying locations for which there are long periods of immobility connected by a period or periods of mobility (e.g., with short periods of immobility representing stops during a trip or stoplights). Stop points may be inferred from shorter periods of inactivity (i.e., on the order of several minutes, or long enough to avoid counting a stop at a stoplight as a false positive, but short enough to prevent a stop for coffee or day care drop-off from being a false negative) that have activity on each side.

Also, start, end, and stop points can be entered manually. For example, a user may press a key on a navigation device when they arrive at an important point along a route so as to identify that point as a stop point through which they would like to travel. Thus, for example, when training a navigation device, the person could press the key when passing a coffee shop if they want to always pass the coffee shop, regardless of whether they stop at the shop during the training period. Such manual stop point entry can have the benefit of allowing for faster training of a navigation device, and can also allow a user to provide preferences explicitly. As another example, a user may prefer to take a particular bridge to work regardless of what real-time traffic data may indicate because the user knows how to "beat" the traffic for the route.

The start point and end point may also be adjusted to simplify a travel route. For example, it may be impractical to provide more than one route near each end of a travel route. That is because there may be only one logical path out of a user's residential neighborhood (and no traffic in the neighborhood). The user might also be required to weave through a large parking lot at work—another area in which navigational advice is not helpful. Thus, the start point and end point, for purposes of computing a suggested route, may be shifted so as to bypass such problems at each end of a trip. However, as shown to the user, one or both points may be kept in their original location so that the user gets end-to-end directions. The user simply will not know that some of the directions were decided statically, i.e., without reference to current traffic conditions.

Other points along a travel route may also be adjusted to match a known street or other travel path. For example, where a street contains multiple lanes, any location information for a travel route can be resolved to a single location for that street. Also, locations in parking lots or other similar locations can be resolved to a single point. In this manner, small and irrelevant variations from one travel route to another can be eliminated.

Each travel route represents a trip at a certain time, such as a daily morning commute over the course of a week or more. Thus, by example, travel route 12 represents a morning commute on a Monday morning, and shows a trip from the user's home to the user's office with a stop in the middle of the commute. That stop may represent, for example, the retrieval of a cup of espresso needed by the user to get the week started on the right foot. Travel route 14 represents the Tuesday morning commute, with no stops, as the user anticipates the amount of work still needed to be completed for the week. The Wednesday travel route 16 is similar to the Tuesday travel route 14. The Thursday travel route 18 also involves a stop, but this time to drop off clothes at a cleaner. Finally, the Friday travel route 20 involves a slight detour and stop for the user to follow through on a weekly doughnut pick-up for the user's office staff—a savvy management technique.

Travel routes 22, 24 are trips on the weekend. Travel route 22 shows a trip to swimming lessons for the user's young child, and is a weekly trip, at least for a dozen lessons or so. Travel route 24 is a trip to a football game, and typically occurs on a Sunday but only when the team is "home." However, from week to week, the end point for the trip varies as the user selects a different parking area for each game. In addition to the routes shown in FIG. 1, other routes may also be gathered, such as those taken during the evening commute.

Figure 2:
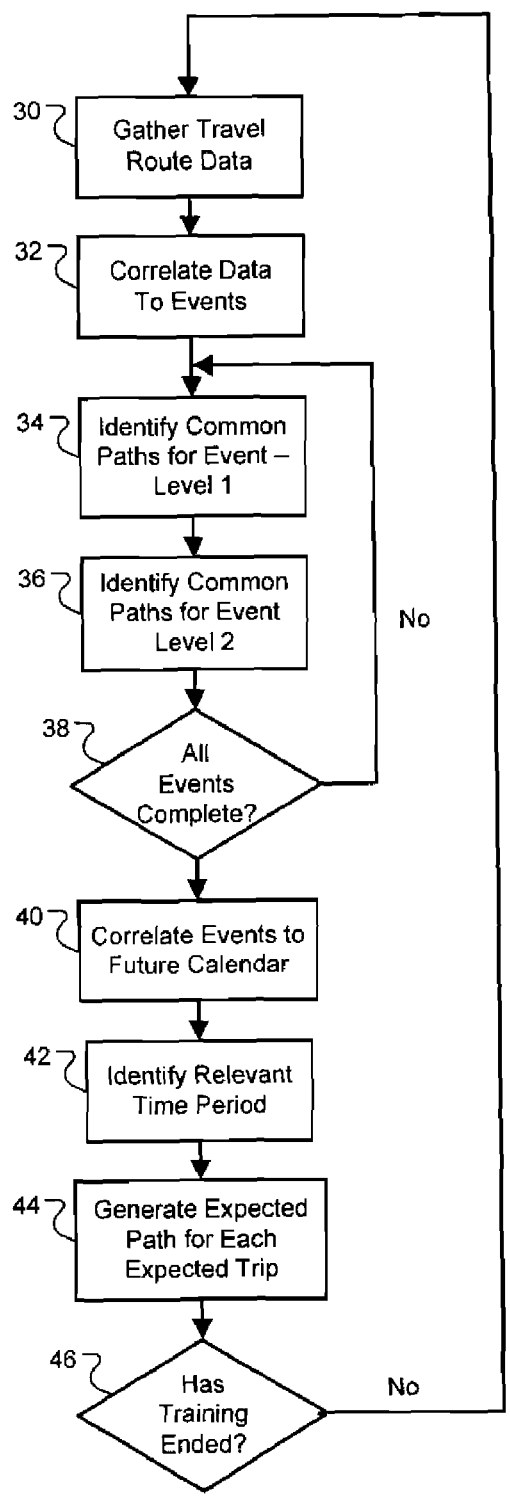
FIG. 2 shows a flow chart of a process for producing expected trip points from past trip routes.

Upon gathering travel routes over a particular time period—typically more than one week—expected travel routes for the future can be generated. FIG. 2 shows a flow chart of a process for producing expected navigation points from past trip routes. In the example, a trip route is a route the user has previously taken, and is similar to the routes discussed above with FIG. 1. Navigation points are stopping points along a trip route, and would include, for example, the start and end points for the trip, along with any necessary stop points along the trip. The computed navigation points may be combined, as explained below, with information about real-time traffic flow, to generate a trip route that hits each of the navigation points in a predicted minimum elapsed time. In this manner, a user's actions may be monitored, and the user may be provided with effective travel planning for future trips.

In FIG. 2, travel route data is gathered at step 30, in a manner like that discussed above. The data is then correlated, at step 32, with particular events. The events may typically be calendar events, and more particularly, certain times and days of the week. For example, all trips that happen during certain hours on a Monday morning may be correlated with a "morning commute" event. The same is true of trips that happen on other weekdays. Trips on Saturdays and Sundays could also be grouped (although weekend trips may be ignored under an assumption that the trips will be too unpredictable, or traffic too light, for the process to provide substantial assistance).

At step 34, common paths for a particular event are identified. For example, if the user took the identical path to work on two successive Mondays, the paths would be fully common. The determination of commonality may also be determined only for characteristic points along the path, i.e., the start point, the end point, and stop points.

The presence or absence of commonality may be determined at various levels of granularity. For example, if several instances of an event have been collected, a point may be considered "common" if it is common to a particular percentage of the instances. As one example, if a system has been gathering data for a month, and a point is common to three out of four trips on a Monday morning, then it could be considered common, and the fourth trip could be considered to be non-representative of the user's actual travels (i.e., a "lark").

Common paths may also be identified at a second event level. As one typical example, commonality could be discerned for all weekdays or for certain weekdays. Thus, if the user is very diligent and makes the same trip every day, commonality could be found for a particular weekday over several weeks and over multiple weekdays also. In particular, commonality may first be determined for all monitored Mondays, and for all monitored Tuesdays, and may then be determined across Mondays and Tuesdays Commonality may again be found if the level of common data exceeds some level that indicates the non-common data is non-representative, so that expected future trips can be assumed to follow the common path rather than any other path.

The search for commonality may also occur in multiple orders. For example, all weekdays may be analyzed individually for commonality, and a common path may be discerned by applying rules to those days. Alternatively, as just described, trips for a particular day may be analyzed, and a common trip for that day computed. Each of the daily common trips may then be compared for commonality. This method has the advantage of eliminating variation at two different levels, but also could eliminate variability that should not be removed because it helps to indicate how a user is likely to act in the future. Unsupervised machine learning techniques such as clustering may also be used to determine commonalities between or among routes.

Once commonality is found for one event or subgroup of events, a determination may be made of whether additional events remain (step 38). If they do, commonality determinations may proceed as just described for those additional events. For example, when one weekday is finished, other weekdays may be analyzed (if they are not a second level of the first event). Or once all weekdays are finished, weekend days may be analyzed. Alternatively, commonality for only a single event (e.g., Monday morning commute) can be computed if that is all that is required.

If all events are complete, a travel profile may be generated for the user. First, events may be correlated to a future calendar (step 40). For example, Monday morning commutes may be mapped onto the Mondays of a calendar running forward into the future. The time period for such mapping may also be identified (step 42) as a control on how far forward the system generates a travel profile. For example, the system can regularly update the information so that a travel profile need only be generated for the next expected trip or for the next day or next week.

Using the analyzed information, the expected navigation points for each expected trip may be established (step 44). Such points may be, for example, the points that were computed to have a sufficiently high level of commonality. For example, where the start point, end point, and a particular intermediate point were all the same for a particular day of the week across multiple weeks, those points may be assigned as the navigation points for that day. Common navigation points from one day to the next may also be used, particularly if enough data has not been collected to determine whether there is commonality from week to week.

Route information between navigation points may also be used or discarded as necessary. For example, navigation points can be computed merely for start, end, and stop points, as it could be assumed that the user simply wants to get to or through those points, wants to do so quickly, and does not care which particular route to use. As such, the other information is not relevant and can be discarded to save on storage space. The other information can also be used to provide more accurate selections of navigation points, indicating for example whether a literal stop by the user should be considered a "stop" navigation point.

The process shown in FIG. 2 may occur, for example, when a user begins a training session with a system, and then indicates that the training session is over and that the user wants to analyze the gathered data from the session. The process may also occur after a predetermined or calculated time period, such as two weeks after the system is first put into "learn mode." In addition, the process may occur periodically, and a travel profile may be generated only when a particular level of commonality is reached. If the commonality is insufficient, the process can be aborted and restarted at a later time.

The process may also occur repeatedly even after a travel profile has been generated. As an example, a system may first generate expected trip paths when enough data has been gathered to allow confident determinations of commonality across various events. The trip paths may then be re-computed or updated periodically, such as once each week, so as to reflect any changes in the user's travel patterns. The data used for re-computing may be a running time-wise "window" that extends back a certain amount of time, such as four weeks. In this manner, if the user develops a new habit, such as day care drop off, the system can adjust to that new habit. Likewise, a user in such a situation could manually ask for an update so as to trigger re-computing of paths or navigation points.

Figure 3:
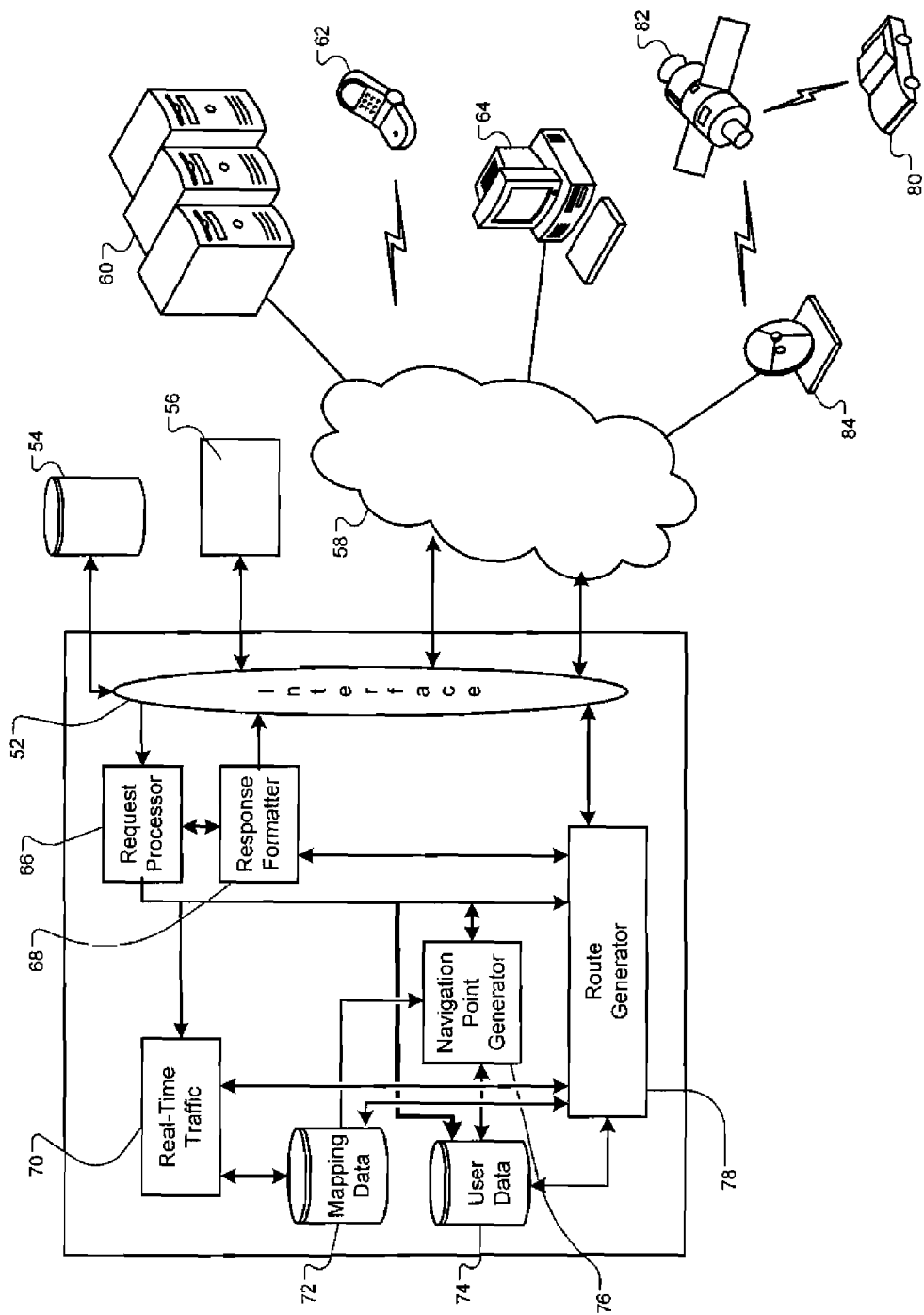
FIG. 3 is a schematic diagram of a system to receive route requests and to generate suggested routes.

FIG. 3 is a schematic diagram of a system 50 to receive route requests and to generate suggested routes. The system 50 includes a device 62, shown as a cellular telephone handset for communicating with a user, but could take any appropriate form, such as a personal digital assistant, a personal computer, or a voice-driven communication device. The device may include appropriate input and output structures, including a display screen which may have a touch-sensitive surface, data entry keys, clickable data entry wheels, speakers, and a microphone including for voice recognition.

Device 62 may obtain the information the user needs through network 58, which may be a single network or combination of networks. Thus, for example, device 62 could communicate through a cellular telephone network using a WAP standard or other appropriate communications protocol. The telephone network could in turn communicate with the Internet, either directly or through another network.

In addition, provision may be made for generating location information for device 62. For example, the device 62 could be a GPS-enabled cell phone or PDA. The device 62 could also be located by triangulation or other techniques.

Alternatively, a device may be provided in the form of a vehicle navigation system 80. The navigation system 80 may communicate, for example, through a satellite network via satellite 82 and base station 84, which may in turn be connected to network 58 for further communication. In this example, communication could be one-way only or two-way. In this manner, the functionality described herein may be provided to users in the manner that is most convenient to each user. In addition, both device 62 and navigation system 80 may be used, so that, for example, the device 62 can handle communications and obtaining information personal to the user, and the navigation system can be used to gather location information (e.g., through a GPS system) and to display maps and other data. The device 62 and navigation system 80 may communicate, for example, via wired or wireless link, such as via IEEE 802.11 standards or Bluetooth communications and the like.

A navigation information system (NIS) 51 may also communicate with the network 58 so as to receive requests from devices 62, 80 and locate information to return to devices 62, 80. The NIS 51 may take any applicable form, and may include a system that provides search services, for example, such as that provided by Google. NIS 51 may be broken into multiple separate systems or sub-systems to allow for scalability, and may be connected to network 58 in any of a variety of ways, as is commonly known.

NIS 51 in general receives requests from devices 62, 80, processes those requests, and provides information that allows the devices 62, 80 to provide a user with a suggested travel route. NIS 51 may rely on appropriate external services to provide such functionality. For example, NIS 51 may obtain data about real-time traffic conditions from traffic service 56. Traffic service 56 may be, for example, an aggregator of information about traffic flow that obtains information from public agencies, roadway monitors, traffic cameras and the like. The information may reflect the speed of traffic flow at particular points in a transportation system, and could include a service such as Zipdash. NIS 51 may take the information received from traffic service 56 and combine it with route information computed for a user to compute a suggested travel route, as explained in more detail below. In this context, real-time traffic conditions are intended to include conditions that are sufficiently recent or accurate to have relevance and be of assistance.

NIS 51 may also communicate with external servers 60 to acquire other needed data. External servers could comprise, for example, mapping servers that provide updated information about roadway locations and other GIS-type data. In addition, NIS 51 may communicate with other databases 54 as needed. These databases may be connected to NIS 51, for example, by a high bandwidth LAN or WAN, or could also be connected to the NIS 51 through network 58. The databases may also be split up so that they are located in multiple locales.

NIS 51 communicates through an interface 52, which may be a single interface or multiple distinct interfaces, including interfaces for internal and external communication. By example, interface 52 may comprise interface devices for a high speed, high bandwidth network such as SONET or Ethernet network cards or any appropriate communication hardware operating under an appropriate protocol, so that NIS 51 can respond to a large number of distinct requests simultaneously. The precise design of the system is not critical to the proper operation of the invention, and could take any appropriate form.

Within NIS 51, a route generator 78 may produce suggested travel route results in response to requests from a user device such as devices 62, 80. The route generator may also be implemented as an external service 60, such as that provided by TelAtlas or the like. The requests may be received and initially processed by request processor 66, such as by parsing them and formatting them from html/text requests to a format that is usable internally to NIS 51.

The information generated by route generator 78 in response to a request may also be converted by response formatter 68 in a manner that allows it to be used by the requesting device, such as in a WAP format, HTML document, XML document, VoiceML result, etc., and then transmitted via interface 52.

Route generator 78 may receive assistance from other components in producing suggested routes. In particular, real-time traffic module 70 may provide the route generator 78 with information that reflects traffic speed on various routes. For example, real-time traffic module 70 may obtain information from traffic service 56 and reformat it in a manner that is usable by route generator 78. Real-time traffic module may also aggregate traffic data from multiple different sources— combining data and selecting the best data when there is overlap. Moreover, the real-time traffic data may include data relating to non-automotive modes of transportation, such as rail, bus, and ferry speeds and schedules (adjusted, e.g., to reflect problems and shut-downs if necessary).

Route generator 78 may also use mapping data 72, which may be stored internally to NIS 51 or obtained from external sources (or both). Mapping data generally represents the routes that may be taken, and may be stored and accessed in any appropriate manner. Mapping data may be, for example, the same or similar data to that which is used to provide driving directions in typical applications. The mapping data may serve as an "underlay" for the real-time traffic information, so that a suggested route can be generated on a map using the traffic information that correlates with locations on the map.

Navigation point generator 76 may operate to receive information about a particular user's travel history, and produce expected route points for future travel, for example, using the methods described above with respect to FIGS. 1 and 2. Navigation point generator 76 stores information it receives from, and generates relating to, users in user data 74. User data 74 may also include other information about a user, such as the user's identifying information, addressing information for the user's devices 62, 80, information about the user's needs and other profile information about the user. Such profile information may also include information about the user's preferences. For example, perhaps the user prefers side streets over freeways, so that the system will provide the user with a suggested route that uses side streets (in some circumstances, if the disparity in commuting time between the two paths is not above some threshold).

In generating a suggested route for a user, route generator 78 may gather the navigation point information for a particular user, may use that information and mapping information to identify potential routes (as combinations of route segments), and may then use real-time traffic information to select which actual route or routes are the best routes for the user. Route generator may then transmit the suggested route information through interface 52 to devices 62 or 80. For devices such as cellular telephones, the information may best be transmitted as an html document or other fully-formatted document that will not required much processing by the device 62. The returned information may also include HTML code, XML messages, WAP code, Java applets, xhtml, plain text, voiceXML, VoxML, VXML, etc., that causes the device 62 to generate a display of information.

For devices such as a vehicle navigation system, which has its own mapping capabilities, the suggested route information may simply be data for a particular route. The device 80 may then interpret that information and combine it with information stored locally to produce a usable map with the suggested route or routes rendered on top of the map.

The transmitted information may also include information in addition to a simple map with routes rendered on it. For example, locations on the map may be provided with hyperlinked icons whose selection will cause additional information to be broadcast to the user. As one example, coffee shops along the user's route may be displayed both as a service to the user and to the coffee shops. Selections by the user for more information about a particular location could result in a small charge to that location, much like the well known AdWords program. Other information may also be displayed, such as icons showing the kind of establishment (e.g., coffee cup next to coffee shop, plate and fork next to sit-down restaurant, stars next to high-end restaurant, etc.).

The information may also be time-based. For example, in the morning hours, coffee shops can be identified, and in the evening hours, restaurants, and then bars, may be identified. Information to be shown may also be based on preferences of the user, which may be discerned by a profile that a user completes, by a standard profile the user adopts (e.g., the system may have particular profile settings for teenagers), or by correlation of preferences with prior actions of the users, such as requests submitted to a search engine or stops that are often made. Such preferences may also be correlated with preferences of other users who have similar past search or other activity. In addition, a profile may be generated by a customer, such as a transportation provider (e.g., a trucking company), so that the profile is applied to all users working for the customer. In this manner, the transportation company could control the type of information provided (e.g., truck stop locations or healthy restaurants so as to lower health insurance premiums) in addition to submitted navigation points for routes likely to be used by its employees.

In addition, a user can choose to have certain routes be required routes and other routes prohibited routes. For example, a drive along a lake may be a required route for Friday afternoon commutes to allow the user to wind down at the end of the week. Alternatively, a drive through certain areas may be prohibited, such as when the user is aware of construction in the area that is not reflected on maps or other general data sources.

Where the device allows for search in addition to navigation, the position of the device and/or the stop points along a route may be used as a location input for a "local search" such as Google Local Search. Thus, for example, where a user is taking a long trip, they may search for a restaurant that is one hour ahead on the map by identifying a location such as a stop point on the map and then conducting a local search. In this manner, the user can have a local search without knowing additional properties about the locale in which the search is to be conducted.

In addition, the routing information can be incorporated with other systems. For example, the suggested route information could be passed on to a transportation operator along with information about actual routes to allow the operator to ensure that most efficient routes are being taken by drivers employed by the operator. Other information may also be shared, including by use of an API model that allows customers to access whatever relevant information they would like to access.

The route generation may be accomplished in the system 50 by NIS 51, by devices 62, 80, or by cooperation of NIS 51 and devices 62, 80. For example, device 62 may be programmed with code that, when executed, analyzes results from a request and then generates stop points on an expected route. Also, the device 62 may be programmed with code that, when executed, generates a map with a suggested route. The NIS 51 may also take on the task of suggested route generation, so that the devices 62, 80 need only receive the information, store it, and present it.

Figure 4:
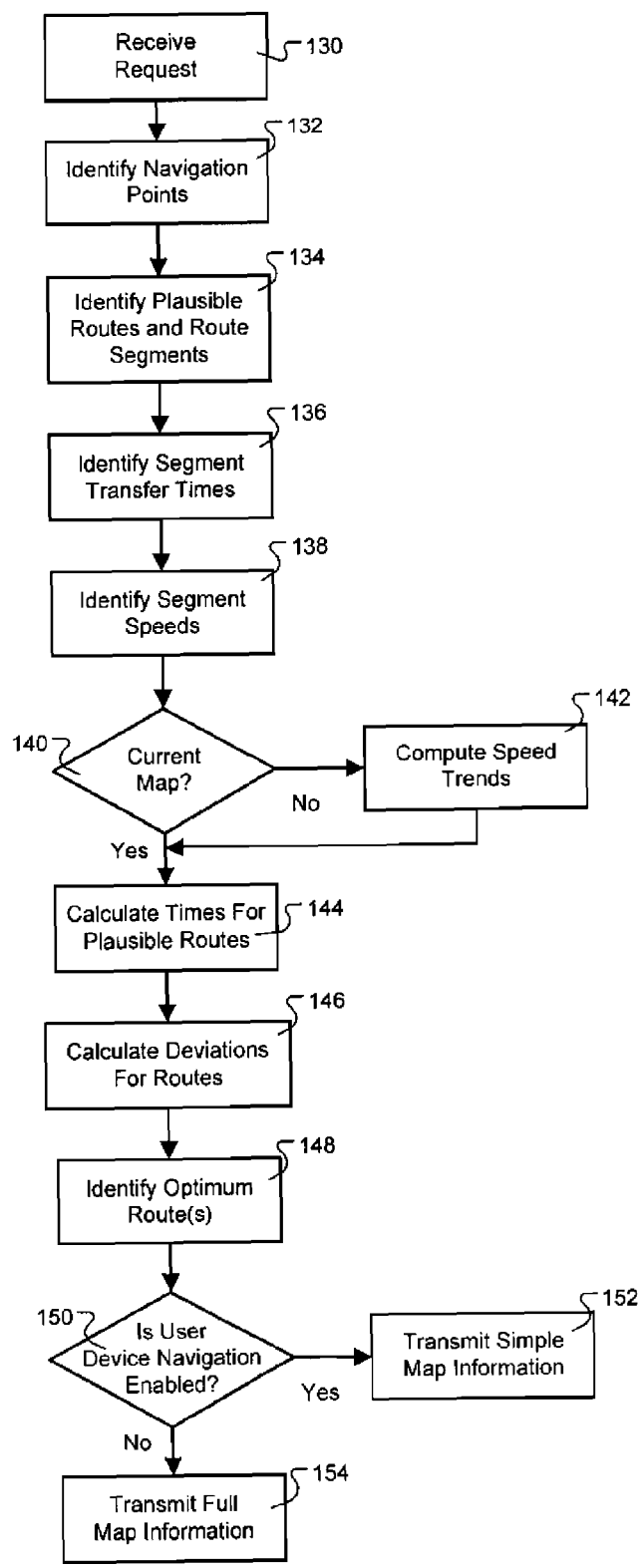
FIG. 4 is a flow chart showing exemplary steps for capturing trip data and providing suggested routes.

FIG. 4 is a flow chart showing exemplary steps for capturing trip data and providing suggested routes. The steps shown may be executed, for example, by NIS 51 or devices 62, 80 shown in FIG. 3, or a combination of those features and/or others. Step 130 shows the receipt of a request for route information. The request may be generated in any appropriate manner. For example, a user may press a key on a PDA when entering their automobile as a means to have an up-to-date suggested route generated for a commute. Alternatively, the device itself can generate the request, such as at a predefined time when a vehicle door is opened, or in connection with the user's schedule (e.g., Outlook schedule), indicating that the user will soon be traveling to a particular location. In such a scenario, data in the calendar can be analyzed to determine the user's likely path so that the path can be generated and ready for the user as soon as they need it. A navigation information system may itself generate the request internally, again typically according to a predetermined schedule.

In response to the request, the system may identify navigation points for the user (step 132). The identification may involve simply accessing data on navigation points for particular events (e.g., for trips at particular times during a week) that have been previously computed. It may also require computation of some or all of the points using past location data for the user.

With the navigation points identified, the plausible routes and route segments between the points may be identified (step 134). The routes may be generated using standard mapping software (e.g., that is commonly used for creating driving directions). The plausible routes may include all routes that pass through the navigation points that could realistically be the fastest route through the points. Maximum possible speeds may be assigned to each segment (e.g., 30 MPH in residential, and 80 MPH on freeways) as an aid in determining which segments are plausible.

The plausible routes may also be comprised of a number of route segments, and again all plausible segments may be identified. For each set of segments, the segment transfer time may be determined (step 136). The segment transfer time includes, for example, expected time spent at stop lights and on-ramps, transferring from one train to another, or in transferring from one mode of transportation to another, such as from automobile to light rail.

For each segment, the real-time speed of the segment may be identified (step 138). The speed may be accessed from, for example, services that track traffic speed using in-road sensors or cameras. The speed may generally be a composite of the average speed across all lanes of traffic, and perhaps along multiple locations of a common roadway (so that temporary bottlenecks do not caused inaccurate readings). The speed may also be an assumed real-time speed, for example on roadways for which there is no actual real-time speed data. Also, speeds may be assumed for mass transit systems, such as light rail, that have closely analyzed and predictable speeds. Such systems may also provide data that reflects actual real-time speeds.

The system may then determine whether the request is for immediate results (step 140). If it is for a map in the future (e.g., more than 30 minutes in the future) such that traffic conditions may change before the results are used, the system may access data relating to speed trends on segments for which actual real-time speeds have been obtained (step 142). The system may also access assumed real-time speed data for the time in the future, or simply use the previously accessed assumed real-time data.

With speeds for each plausible segment determined, the travel time for each segment can be computed (step 144). Total trip times for each permutation of segment combinations may be computed, with segment transfer times added between segments. The determination may be aided by well known approaches for determining "best" or "least cost" solutions to particular problems, so that not all permutations need be computed.

In addition, deviations for each route may be computed (step 146). In particular, data about the speeds for a particular route or segment will vary from day-to-day, so that the average speed is not a completely satisfactory measure of the segment's speed. Thus, where two routes have similar average times, the route having a smaller deviation may be preferred over the other route (particularly if the user is risk-averse).

With the times for the plausible routes calculated (and optionally with deviations factored into the times), an optimum route or optimum routes can be identified. In general, the optimum route is the route with the lowest expected cumulative time. However, other routes can also be provided as optimum routes in case the user prefers one route over another, and the difference in time is minimal to the user. Also, the user may have defined certain navigation points as preferred points, but not required points, so that routes through those points are presented as optimum routes in addition to routes through the required points. The user may then be given the opportunity to select a route through preferred points if it is shorten than, or not much longer than, the other routes.

The system then may prepare to transmit information to the user. If the user's device is navigation-enabled such that it has its own mapping information (step 150), simple map information can be transmitted and the user's device may use the transmitted information as an input for the mapping function. The user's device may also then provide additional navigation functions with the data, such as voice prompted driving instructions. If the user's device is more limited (e.g., a simple cell phone), more complete mapping information may be transmitted (step 150). For example, an entire recommended route can be rendered in a single document and transmitted to, for example, a web-enabled telephone.

Figure 5:
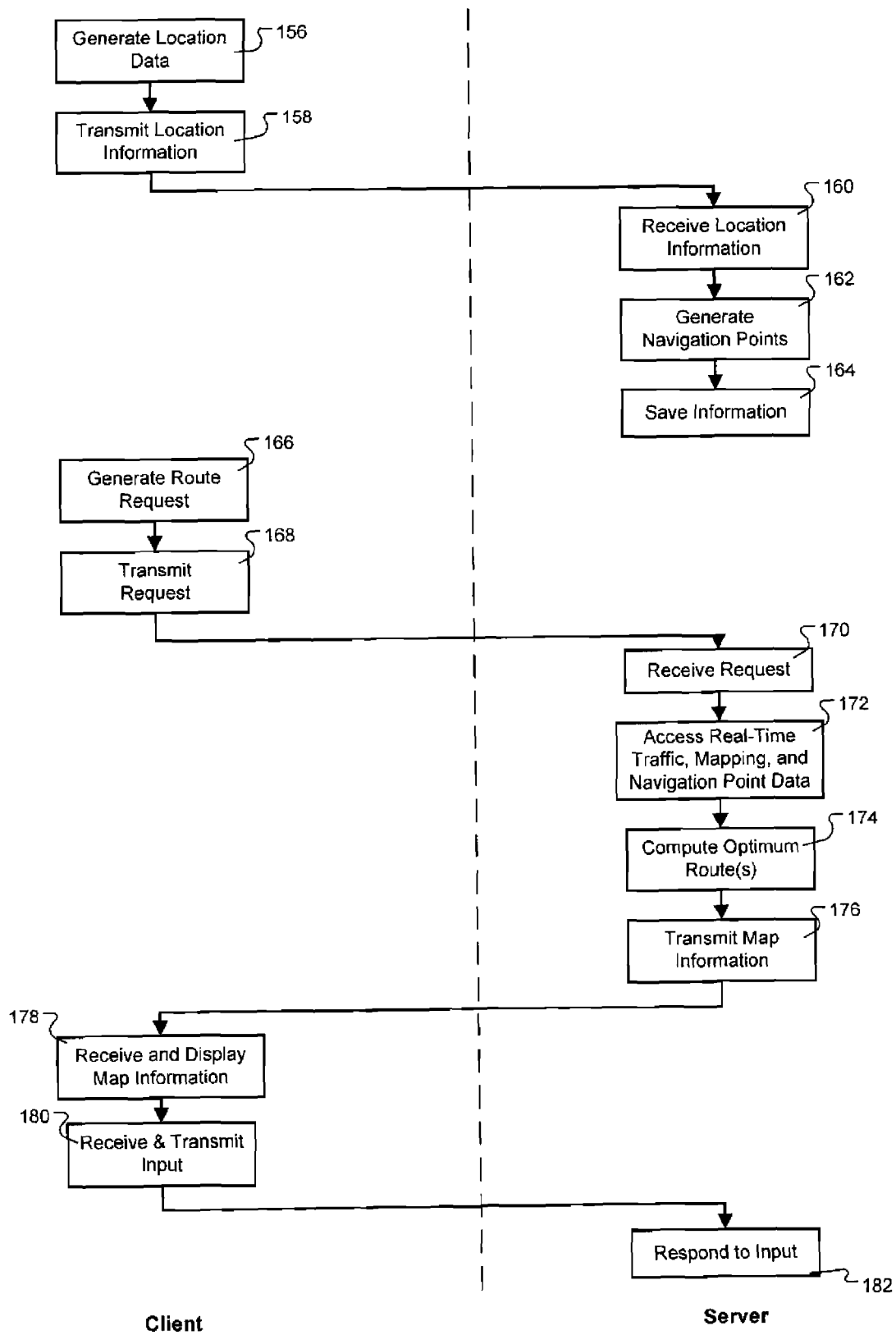
FIG. 5 is a client-server flow chart showing exemplary steps for providing suggested routes for observed trip patterns.

FIG. 5 is a client-server flow chart showing exemplary steps for providing suggested routes for observed trip patterns. At step 156, location data is generated, such as by acquiring locations from a GPS appliance at particular time intervals. At step 158, location information is transmitted from a device at which it was generated. The term "information" is used here as opposed to "data" to indicate that the actual generated data may be different than what is transmitted. For example, numerous readings for locations may be generated, but only a subset transmitted, or a facsimile (such as an averaged set) may be transmitted.

The server may then receive the transmitted location information (step 160) and may generate navigation points using the information, as described above (step 162). With the navigation points generated, the system may save the new information and wait for a request (step 164).

When a user wishes to have a suggested route generated, they may have a device generate a request (step 166) in a manner like that described above, and the device may transmit the request to a server (step 168). The server may receive the request (step 170) and use it to compute a suggested route or routes. In doing so, the server may access one or more of real-time traffic information, mapping information, and navigation point data (step 172). The server may also access profile information and other information specific to the user. By applying the real-time traffic data to possible routes through the navigation points, the system can compute one or more optimum routes (step 174) for the user.

The system may then generate navigation information, such as in the form of map information, and transmit it back to the user's device (step 176). The information may be transferred as data that can then be mapped using a navigation system, or may be transferred as a rendered map, such as via HTML document (step 178). Additional related information may also be transferred. For example, as indicated above, information about features near the route can be included, including hyperlinks that allow access to even more information. Also, advertising may be generated that is relevant to locations along the route, so that, for example, eating establishments along the route may pay to have advertising distributed to users who pass by. The advertising may also be segregated according to routes that are primarily commuter routes with recurrent travelers, and routes that are main transportation routes (such as rural interstate highways) that do not have recurrent travelers. (I.e., advertisements for the latter routes may have more advertising to draw attention to local attractions, while those for the former would have more day-to-day advertising.) Provision of advertising would have the benefit to users of providing additional information and also lowering the cost of the navigation service.

A user may then provide additional input (step 180) after the initial information is transmitted. For example, the user may click on a provided hyperlink, in which case the device will transmit a request relating to the hyperlink (step 180). The server may then respond to the request (step 182) in a conventional manner, such as by sending typical web content. In addition, various other on-line options may be used along with, or in addition to, the navigational features described here.

Figure 6:
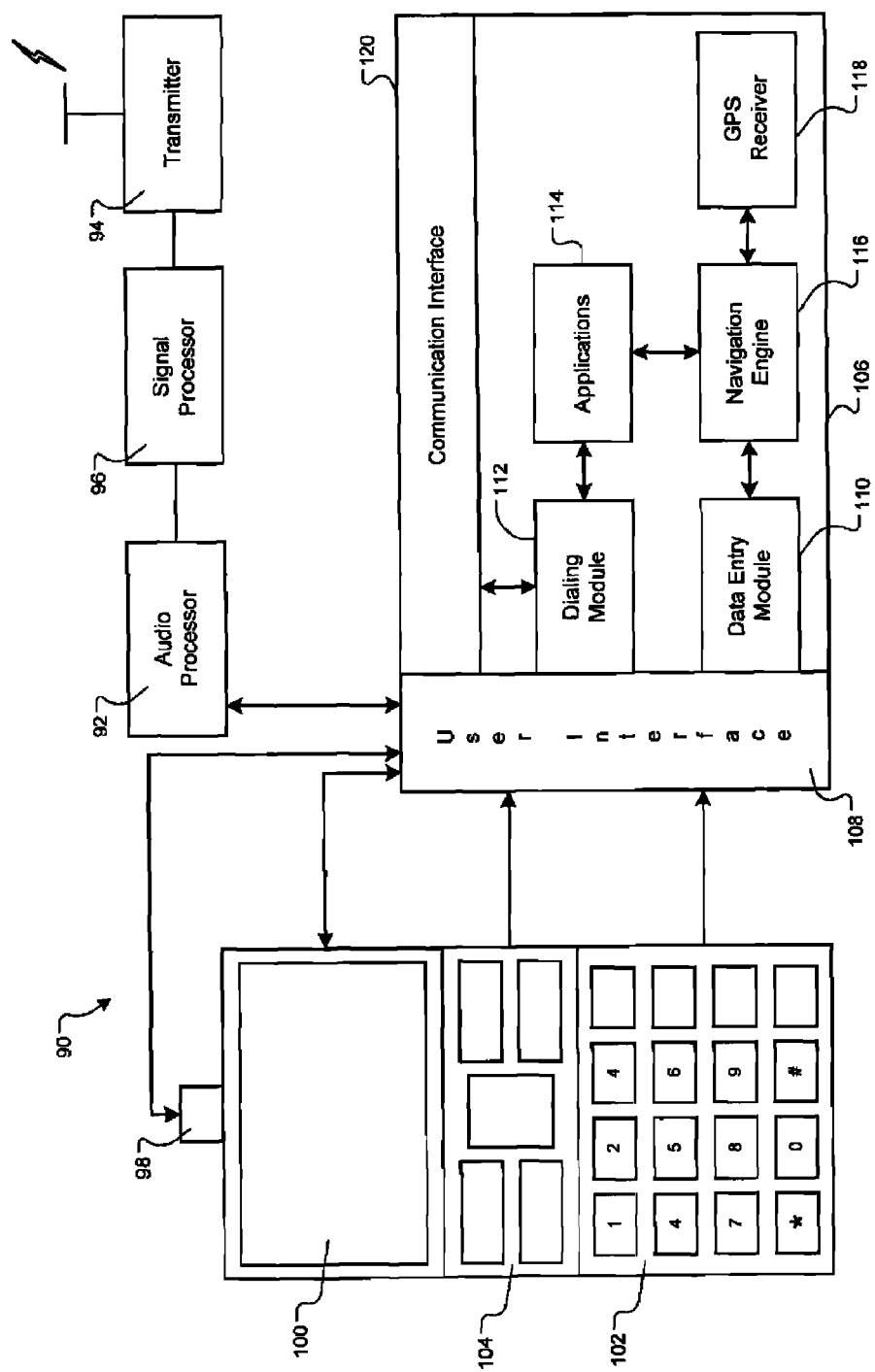
FIG. 6 is a schematic diagram of a wireless communication handset for capturing trip data and providing suggested routes to a user.

FIG. 6 is a schematic diagram of a wireless communication handset for capturing trip data and providing suggested routes to a user. The handset 90 receives and transmits information wirelessly using transmitter 94, with the received signals being passed to signal processor 96, which may comprise digital signal processor (DSP) circuitry and the like. Normal voice communication is routed to or from audio processor 92, which may communicate with speaker/microphone 98, including via user interface 108.

User interface 108 handles all communication with the user of the system 90, including voice, visual, and data entry communication. Visual presentation of information may be provided via display screen 100. General data entry, apart from entered voice data, may occur through keypad 102, which may be arranged as a standard 12-key telephone keypad. The device may also be provided with appropriate control keys 104 for performing necessary control functions. Key pad 102 and control keys 104 may include contact push-buttons, joysticks, portions of touch-sensitive panels, or other appropriate input devices. Although the communication is shown for clarity as occurring through a single user interface 108, multiple interfaces may be used, and may be combined with other components as necessary.

The system 90 may be provided with a number of computer applications 114, such as games, applications to assist in dialing numbers, and applications to permit web browsing, including the entry of data as part of the web browsing. The applications 114 may be stored in ROM, Flash memory, RAM, MRAM, or otherwise, as appropriate, and may be accessed by the system 90 as needed. A dialing module 112 may provide standard dialing functionality for the system, receiving entered dialing digits or voice dialing instructions through interface 108, and providing appropriate dialing signals through transmitter 94 using communication interface 120.

A data entry module 110 receives data other than dialing instructions, such as search data entered into the system 90. The data entry module 110 may provide the entered data directly to an application, or may employ a navigation engine 116 to help gather navigation information and supply route information to a user. The navigation engine may receive location information via GPS receiver 118, and may supply this information to an application 114 for the generation of expected navigation points in a manner like that described above. Although the navigation engine 116 is shown as a single item separate from the applications, it could simply be an application itself or part of an application having code to carry out the necessary functions.

The system may take many other forms. For example, it could be implemented as part of a personal computer, whether networked or un-networked, and if networked, whether by wire or wirelessly. Also, data entry may occur in different manners, including by complete keyboard, constrained keyboard, or voice command. Also, one or more components may be located remotely from the device, such as at a remote server, and the functionality of the device may be provided by combining the components or using components other than those shown.

Figure 7:
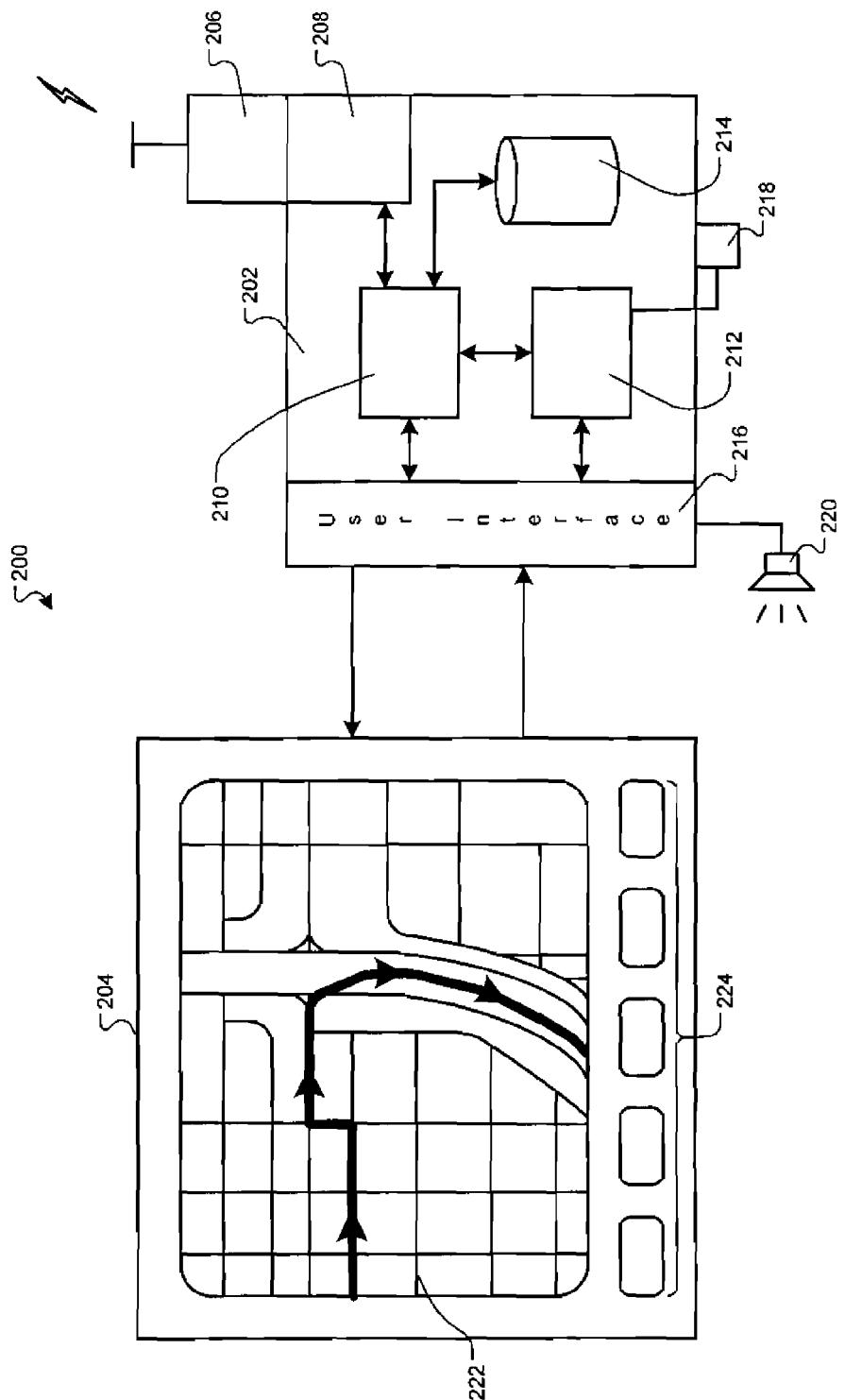
FIG. 7 is a schematic diagram of a wireless navigation device for capturing trip data and providing suggested routes to a user.

FIG. 7 is a schematic diagram of a wireless navigation device 200 for capturing trip data and providing suggested routes to a user. This device is similar to the device in FIG. 6, and although it may be provided with voice communication capabilities, it as shown as simply a wireless-enabled navigation system. The device 200 may comprise a navigation computer 202 for handling the needed communications and processing for the device 200, and a navigation display 204 for input and output. The navigation display 204 may be, for example, an in-dash LCD display in an automobile.

The navigation computer 202 is provided with a transceiver 206, which may be a wired transceiver (e.g., for transferring data to and from a PDA or cell phone) or a wireless transceiver, such as a satellite communication or Bluetooth transceiver. Signals received by transceiver 206 may be processed by signal processor 208, which may be a standard digital signal processor (DSP). The signals may then be provided to various applications 210, which may include system applications for operating device 202 and other discrete application programs, such as browser, communication, and other programs.

The applications may include, or make use of, navigation engine 212 which may be programmed with code that when executed carries out the necessary and relevant operations described above. In particular, navigation engine 212 may collect data on the location of the device 200 using, for example, GPS device 218. Navigation engine 212 may also use mapping data 214, such as to generate maps on display 204 showing the location of the device. Also, navigation engine 212 may alone or in combination with applications 210 generate maps showing suggested routes either computed by mapping engine 212, or by an external device such as a server with which navigation computer 202 communications.

Communication between display 204 and navigation computer 202 may occur through user interface 216, which may be a single interface or multiple interfaces, and may take any appropriate form. The user interface may provide cues to a user via speaker 220, such as by providing aural driving directions in a conventional manner. The user interface 216 may also generate graphical information on display 204 for the user to review. The user may provide feedback or other input through control buttons 224, or through touching screen 222, or by other appropriate input techniques. The control buttons 224 may be "customized" by displaying changing labels above the buttons, so that input and output can be coordinated and controlled via software.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the internet.

The computing system can include clients and servers. A client and server are generally remote from each other and typically interact through a communication network. The relationship of client and server arises by virtue of computer programs running on the respective computers and having a client-server relationship to each other. The client-server relationship need not fit a formal client-server definition, however.

Although a few embodiments have been described in detail above, other modifications are possible. Portions of this disclosure discuss operation though portable devices, but any of a number of devices may be used, including fully-functional general purpose computers. Also, the logic flows depicted in the figures do not require the particular order shown, or sequential order, to achieve desirable results. Also, other steps may be provided, or steps may be eliminated, from the described flows, and other components may be added to, or removed from, the described systems. Other embodiments may be within the scope of the following claims.

What is claimed is:

1. A computer-implemented method of providing personalized route information, comprising:

obtaining a plurality of past location indicators over time for a wireless client device;

determining a future travel objective from a starting point to a destination for a user of the device using the plurality of previously-gathered location indicators with determining the future travel objective including identifying the starting point and the destination based on long periods of immobility connected by one or more periods of mobility;

obtaining, at a server system remote from the wireless client device, near real-time traffic data for an area proximate to the determined travel objective;

determining estimated total trip times for a plurality of routes from the determined starting point to the determined destination, the estimated total trip times being based at least in part on the near real-time traffic data;

generating at the server system a suggested route for the travel objective using the traffic data based on the determined estimated total trip times; and providing from the server system to the wireless client device map data formatted to generate a map showing the suggested route on the wireless client device.

2. The method of claim 1, wherein determining the future travel objective further comprises determining one or more stop points for a user of the device using the plurality of previously-gathered location indicators.

3. The method of claim 2, wherein determining the one or more stop points comprises identifying the one or more stop points based on shorter periods of immobility.

4. The method of claim 1, further comprising determining estimated time deviations from the estimated total trip times.

5. The method of claim 4, wherein generating the suggested route further comprises generating the suggested route based on the determined estimated total trip times and the determined estimated time deviations.

6. The method of claim 1, further comprising receiving from a user an indication of an intent to have the client device enter a learn mode, and to gather location indicators only during the learn mode.

7. The method of claim 1, wherein the map data is provided at a predetermined time of day.

8. The method of claim 1, further comprising transmitting information indicative of real-time traffic data to the wireless device.

9. The method of claim 1, further comprising identifying one or more advertisements targeted to locations on the map and providing indicators for the advertisements with the map data, wherein the advertisements are targeted based on a profile of the user.

10. The method of claim 9, wherein the advertisements are further targeted to information in a profile for a user of the wireless client device.

11. The method of claim 9, further comprising charging a business for a location associated with one of the advertisements if a user of the wireless client device interacts with the advertisement.

12. The method of claim 1, wherein each location indicator is gathered as the result of a cell-tower hand-off for the device.

13. The method of claim 1, wherein the location indicators are grouped according to multiple different time periods.

14. The method of claim 1, further comprising generating an updated suggested route based on updated real-time traffic data and position information from the device.

15. The method of claim 1, further comprising a calendar for a user of the wireless client device and generating the suggested route based on a future entry in the calendar.

16. The method of claim 1, further comprising receiving navigation points manually entered by a user of the wireless client device between endpoints of a route, and requiring that the suggested route pass through the navigation points.

17. A computer-implemented navigation system, comprising:
- a location generator for a mobile computing device that produces data indicative of a plurality of computing device locations;
- a navigation point generator at a server system remote from the computing device that analyzes the data indicative of a plurality of device locations and determines a travel objective from a start to a destination for a user of the device by identifying the starting point and the destination based on long periods of immobility connected by one or more periods of mobility;
- a route generator at the server system that:
  - receives information indicative of near real-time traffic data near the one or more expected navigation points,
  - determines estimated total trip times for a plurality of routes from the determined starting point to the determined destination, the estimated total trip times being based at least in part on the near real-time traffic data; and
  - generates data for one or more optimized routes for the travel objective based on the determined estimated total trip times; and
- a response formatter at the server system to generate a document for transmission to the computing device, wherein the document includes a map showing the one or more optimized routes.

18. The computer-implemented navigation system of claim 17, wherein the document further includes one or more advertisements targeted to locations on the map.

19. The computer-implemented navigation system of claim 18, further comprising a billing unit to charge a business for a location associated with one of the advertisements if a user of the mobile device interacts with the advertisement.

20. The computer-implemented navigation system of claim 17, wherein the route generator determines estimated time deviations from the estimated total trip times for at least some of the plurality of routes.

21. The computer-implemented navigation system of claim 20, wherein the route generator generates the data for the one or more optimized routes based on the determined estimated total trip times and the determined estimated time deviations.

22. The computer-implemented navigation system of claim 17, wherein the information indicative of traffic data includes real-time traffic data.

23. A computer-implemented navigation system having memory for storing instructions that, when executed:
- obtain a plurality of past location indicators over time for a wireless client device;
- determine a future travel objective determining a future travel objective from a starting point to a destination for a user of the device using the plurality of previously-gathered location indicators by identifying the starting point and the destination based on long periods of immobility connected by one or more periods of mobility;
- obtain, at a server system remote from the wireless client device, near real-time traffic data for an area proximate to the determined travel objective;
- determine estimated total trip times for a plurality of routes from the determined starting point to the determined destination, the estimated total trip times being based at least in part on the near real-time traffic data;
- for at least some of the plurality of routes, determine estimated time deviations from the estimated total trip times
- generate at the server system a suggested route having a reduced travel time for the travel objective using the traffic data based on the determined estimated total trip times and the determined estimated time deviations; and
- provide from the server system to the wireless client device map data formatted to generate a map showing the suggested route on the wireless client device.

24. The computer-implemented navigation system of claim 23 further having memory storing instructions that, when executed, generate a location information for use in computing expected navigation points for the device based on past locations for the device.

25. The computer-implemented navigation system of claim 24, wherein the expected navigation points are computed for a time period corresponding to a time period for the past locations for the device.

26. The computer-implemented navigation system of claim 23, wherein the obtaining of information showing a suggested navigation route occurs at a predetermined time of the day.

27. A computer-implemented navigation system, comprising:
- a location generator for a moving vehicle that produces data indicative of a plurality of vehicle locations;
- a navigation point generator at a server system remote from the vehicle that analyzes the data indicative of a plurality of vehicle locations and generates expected navigation points for the vehicle by identifying a starting point and a destination based on long periods of immobility connected by one or more periods of mobility;
- means for generating one or more optimized routes through the expected navigation points based on estimated total trip times for a plurality of routes through the expected navigation points for the plurality of routes; and
- means for generating a representation of the one or more optimized routes for transmission from the server system to the vehicle.

* * * * *